(12) United States Patent
Sato

(10) Patent No.: US 9,313,202 B2
(45) Date of Patent: Apr. 12, 2016

(54) COMMUNICATION APPARATUS, RELAY APPARATUS, WIRELESS COMMUNICATION SYSTEM, CONTROL METHOD OF COMMUNICATION APPARATUS, CONTROL METHOD OF RELAY APPARATUS, AND STORAGE MEDIUM

(75) Inventor: Ryosuke Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 587 days.

(21) Appl. No.: 13/176,306

(22) Filed: Jul. 5, 2011

(65) Prior Publication Data

US 2012/0030735 A1 Feb. 2, 2012

(30) Foreign Application Priority Data

Jul. 29, 2010 (JP) ................................. 2010-171175

(51) Int. Cl.
*G06F 7/04* (2006.01)
*H04L 29/06* (2006.01)

(52) U.S. Cl.
CPC ............ *H04L 63/0884* (2013.01); *H04L 63/08* (2013.01)

(58) Field of Classification Search
CPC ..................................................... H04L 63/08
USPC ............................................................. 726/5
See application file for complete search history.

(56) References Cited

U.S. PATENT DOCUMENTS

| 7,639,943 | B1 * | 12/2009 | Kalajan .................... 396/429 |
| 2002/0007460 | A1 | 1/2002 | Azuma .................... 713/201 |
| 2004/0171371 | A1 * | 9/2004 | Paul ...................... 455/414.4 |
| 2005/0102381 | A1 * | 5/2005 | Jiang et al. ................ 709/220 |
| 2008/0104690 | A1 * | 5/2008 | Hirai et al. ................ 726/14 |

FOREIGN PATENT DOCUMENTS

JP 2002-032340 A 1/2002

* cited by examiner

*Primary Examiner* — Esther B Henderson
(74) *Attorney, Agent, or Firm* — Fitzpatrick, Cella, Harper & Scinto

(57) ABSTRACT

A communication apparatus, which is connected to a relay apparatus, and transmits data to a server apparatus connected via the relay apparatus, includes a determination unit which determines whether the communication apparatus or the relay apparatus holds authentication information used in authentication processing required to access the server apparatus, a decision unit which decides, according to the determination result, a transmission method required to transmit the data by controlling an authentication processing unit of the apparatus that holds the authentication information to execute the authentication processing, and a transmission unit which transmits the data by the decided transmission method.

18 Claims, 19 Drawing Sheets

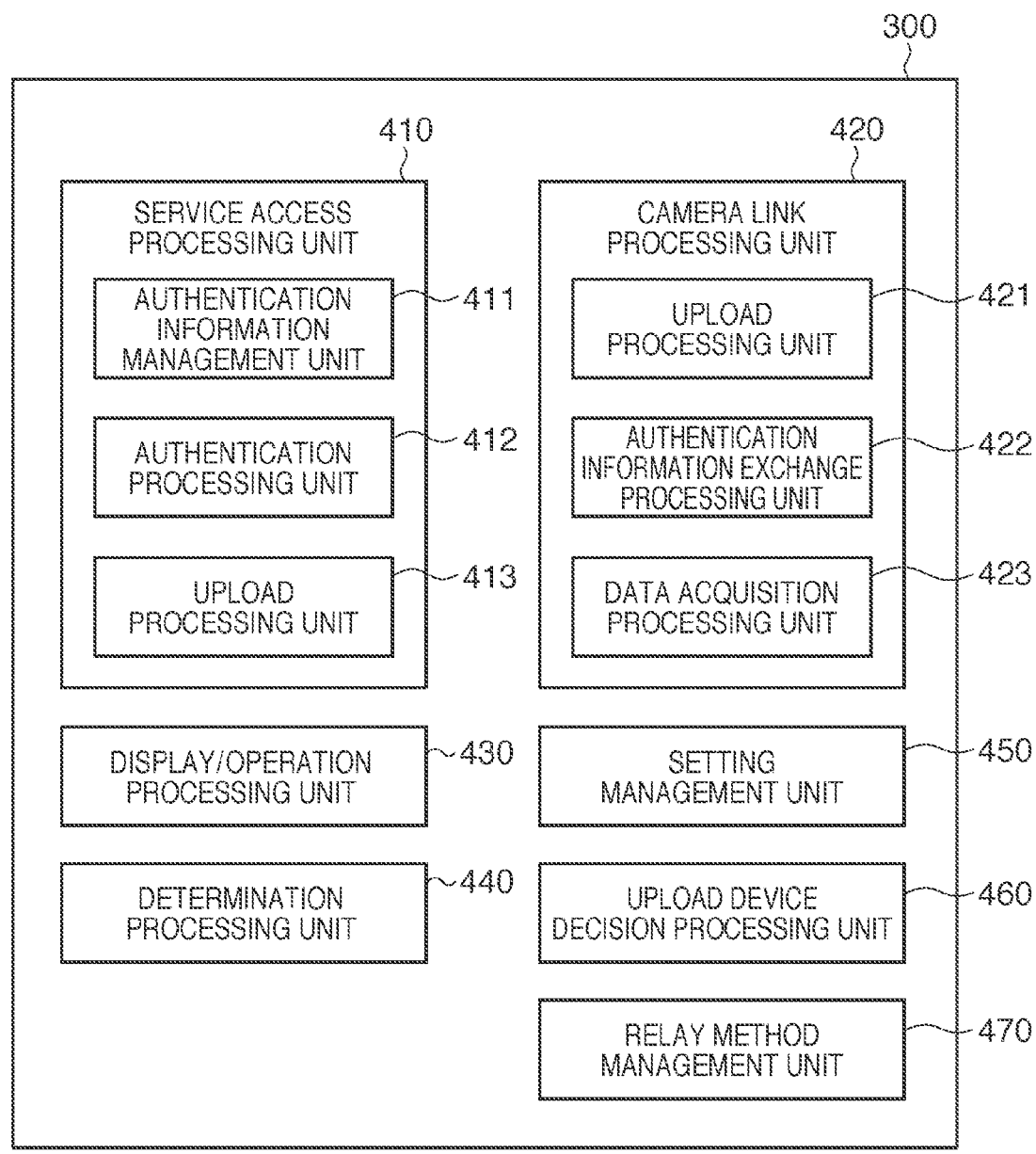

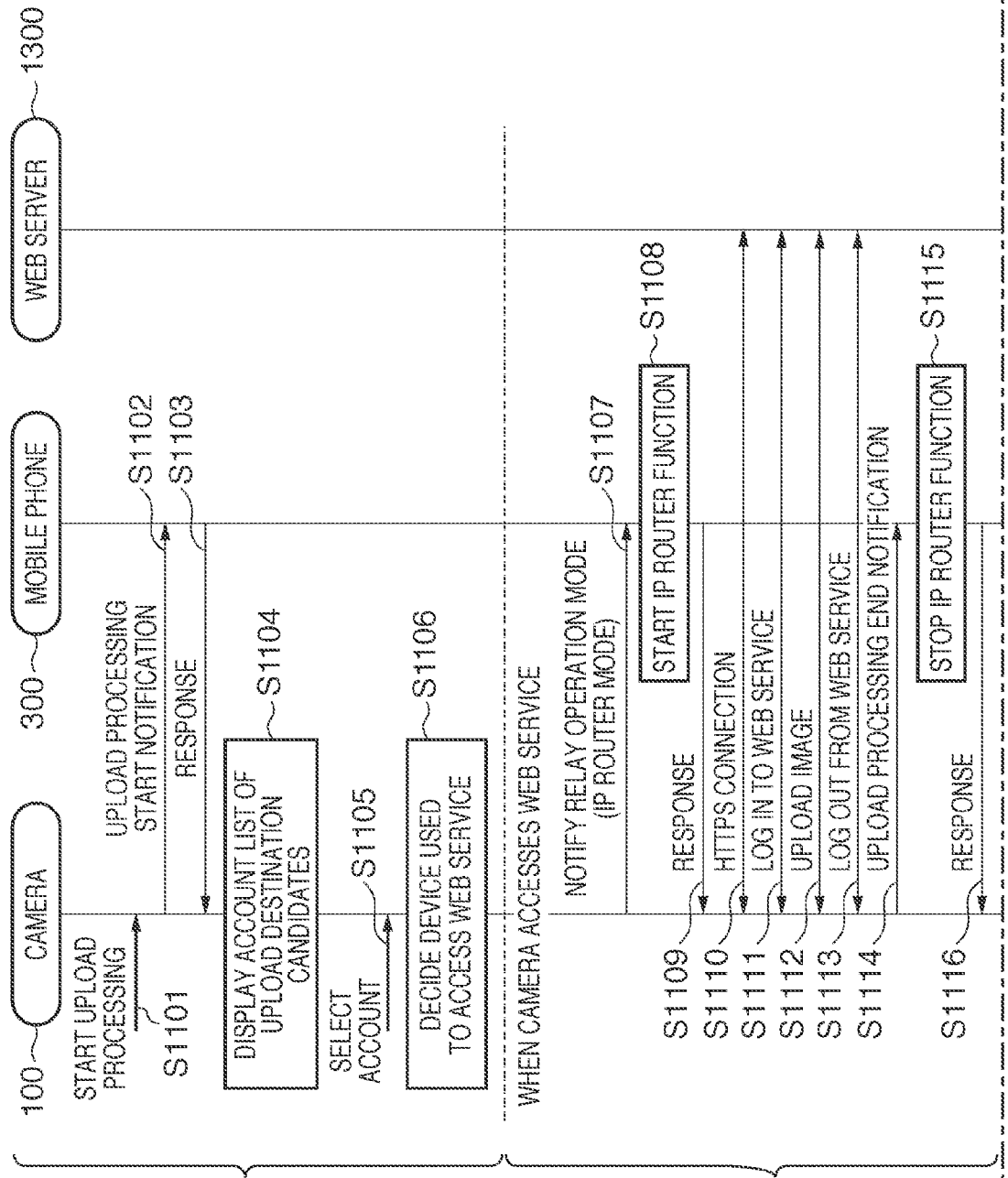

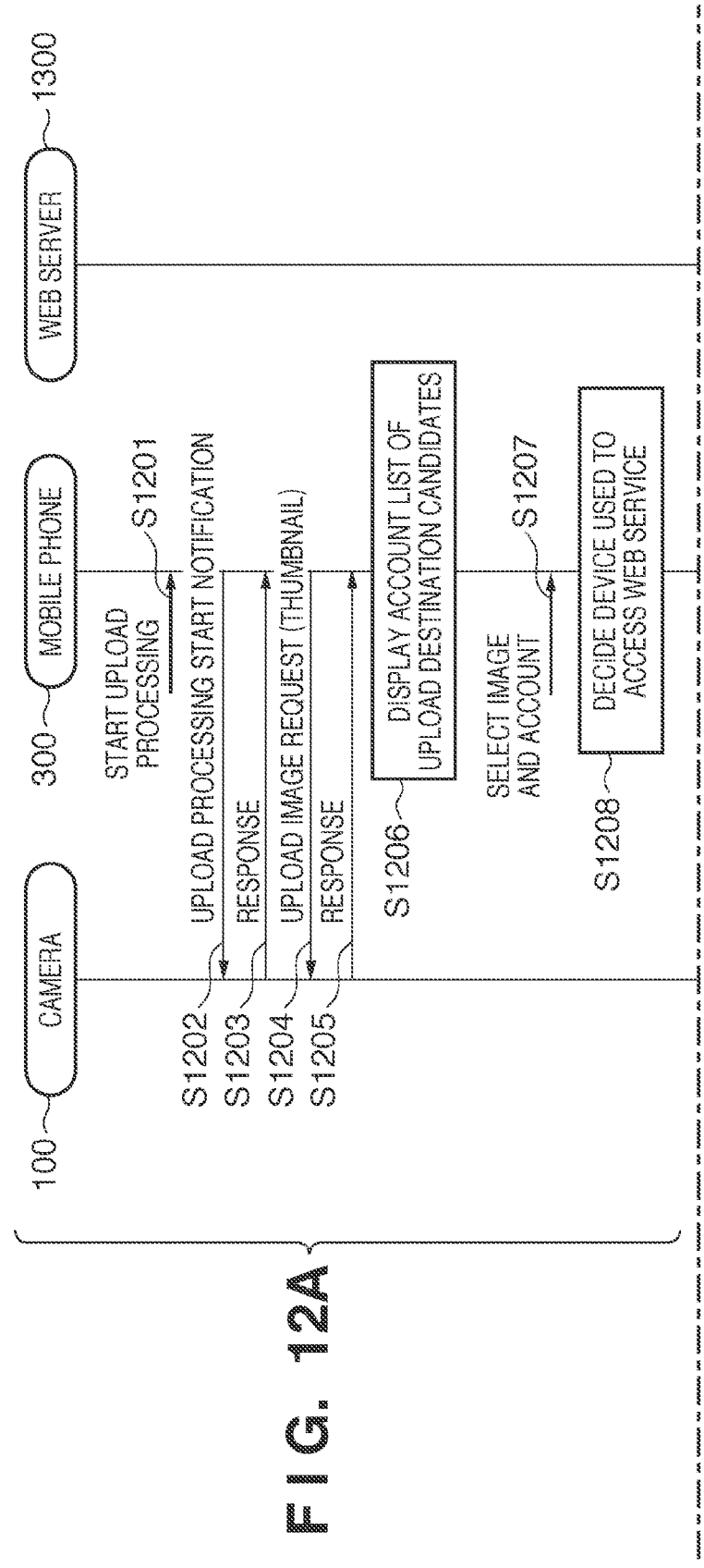

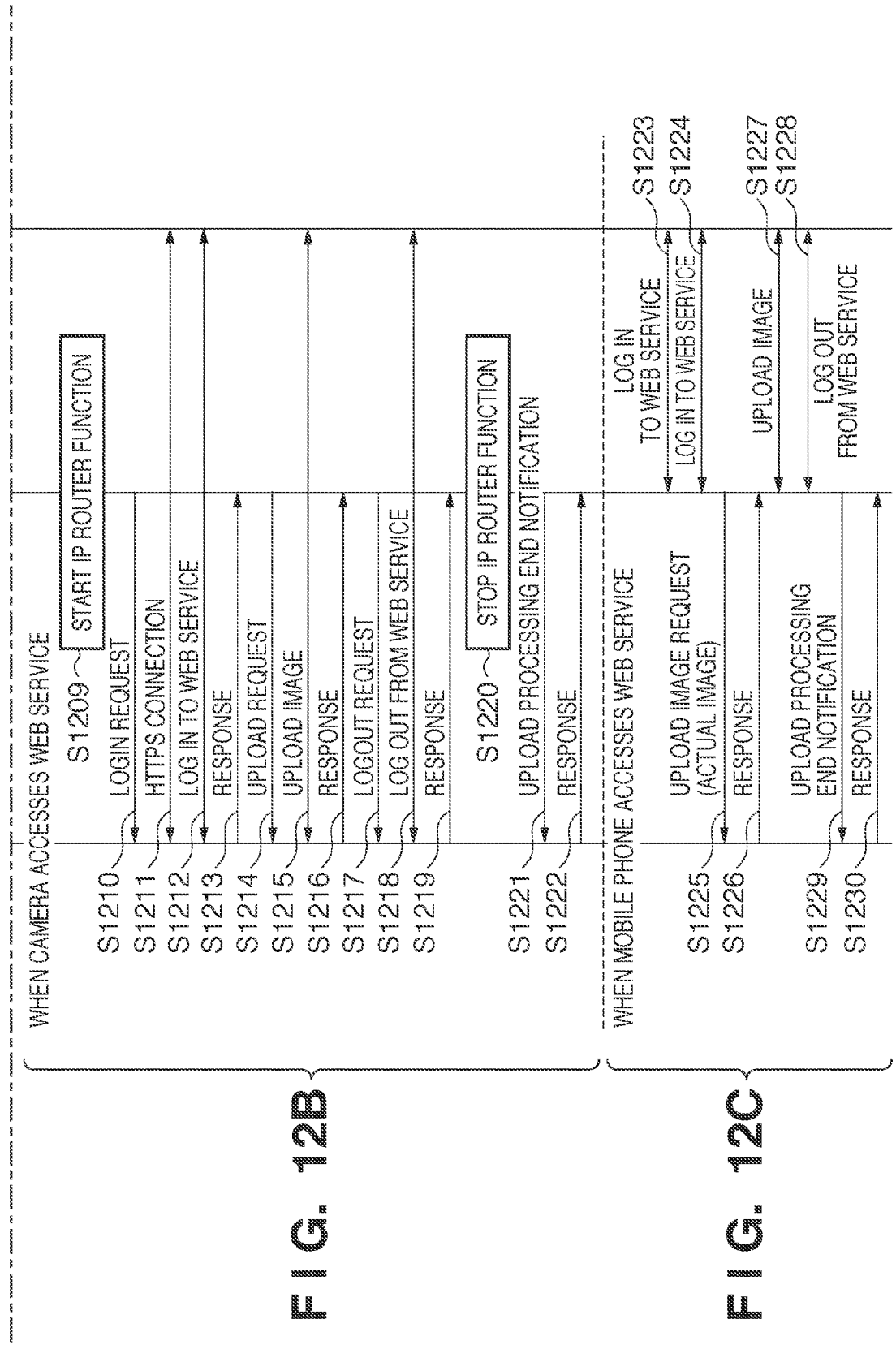

| No. | USER NAME | PASSWORD | UPDATE DATE |
|---|---|---|---|
| 1 | satou | ai3n#Nd | 2010/1/1 |
| 2 | suzuki | 837U3y7s | 2010/3/15 |

| No. | USER NAME | PASSWORD | UPDATE DATE |
|---|---|---|---|
| 1 | suzuki | ZZZ83jSe | 2010/4/9 |
| 2 | tanaka | 3289JUens | 2010/4/1 |

COMMUNICATION APPARATUS, RELAY APPARATUS, WIRELESS COMMUNICATION SYSTEM, CONTROL METHOD OF COMMUNICATION APPARATUS, CONTROL METHOD OF RELAY APPARATUS, AND STORAGE MEDIUM

BACKGROUND OF THE INVENTION

1. Field of the Invention

The present invention relates to a communication apparatus, a relay apparatus, a wireless communication system, a control method of the communication apparatus, a control method of the relay apparatus, and a storage medium.

2. Description of the Related Art

Mobile phones which can upload image files to Web services (image sharing services) on the Internet are available. Also, cameras which can upload captured images to similar services are available. Such devices normally hold account information required to access a Web service in them.

In recent years, cameras and mobile phones, which have near distance wireless interfaces for, for example, a wireless LAN, have become available. When such cameras and mobile phones are connected via wireless communication, by allowing the mobile phone to serves as a relay apparatus between the camera and Web service, a system which uploads an image in the camera to the Web service can be built.

The above system desirably adopts an operation method that allows the user to upload an image to a Web service by only operating one of the camera and mobile phone. For example, a system in which when the user selects a Web service type, an account to be used, and an image to be uploaded using the camera, the selected image is uploaded without requesting any user operations on the mobile phone is desirable.

Focusing attention on an account used in upload processing, it is desirable to execute the upload processing without causing the user to consider whether the mobile phone or camera holds account information that he or she wants to use. For example, when the user starts upload processing by operating the camera, it is desirable to display account information held by the camera and that held by the mobile phone on the camera and to allow the user to execute the upload processing to either of these accounts.

Upon building the aforementioned system, a device (camera or mobile phone) operated by the user is required to acquire account information managed by a connection partner device, so as to allow the user to select an account used in upload processing.

A technique in which communication devices transmit account information, and a device which receives the account information accesses a Web service is known. For example, U.S. Pre-Granted Publication No. US2002/0007460 (Japanese Patent Laid-Open No. 2002-032340) has proposed a user authentication proxy apparatus arranged between a user terminal and Web service. According to this reference, the user terminal transmits account information to the user authentication proxy apparatus, which executes authentication processing for the Web service using the received information.

In U.S. Pre-Granted Publication No. US2002/0007460, since the user authentication proxy apparatus executes the authentication processing for the Web service, the user terminal transmits account information required in authentication of the Web service to the user authentication proxy apparatus. This account information includes confidential information such as a password.

However, in the aforementioned system using the camera and mobile phone, a camera and mobile phone of different owners may be connected. For this reason, notification of confidential information such as a password to a connection partner poses a security problem.

SUMMARY OF THE INVENTION

The present invention has been made in consideration of the above problems, and provides apparatuses and a system, which allow the user to upload an image without considering whether a device which manages an account of a Web service is a camera or mobile phone in the aforementioned system.

In this case, the present invention provides apparatuses and a system, which can execute authentication processing for a Web service without exchanging any confidential information such as a password between a camera and mobile phone.

According to one aspect of the present invention, there is provided a communication apparatus, which is connected to a relay apparatus, and transmits data to a server apparatus connected via the relay apparatus, the apparatus comprising: a determination unit adapted to determine whether the communication apparatus or the relay apparatus holds authentication information used in authentication processing required to access the server apparatus; a decision unit adapted to decide, according to a determination result of the determination unit, a transmission method required to transmit the data by controlling an authentication processing unit of the apparatus that holds the authentication information to execute the authentication processing; and a transmission unit adapted to transmit the data by the transmission method decided by the decision unit.

According to another aspect of the present invention, there is provided a relay apparatus, which is connected to a communication apparatus and a server apparatus, and relays transmission of data from the communication apparatus to the server apparatus, the apparatus comprising: a determination unit adapted to determine whether the communication apparatus or the relay apparatus holds authentication information used in authentication processing required to access the server apparatus; a decision unit adapted to decide, according to a determination result of the determination unit, a transmission method required to transmit the data by controlling an authentication processing unit of the apparatus that holds the authentication information to execute the authentication processing; and a transmission unit adapted to transmit the data by the transmission method decided by the decision unit.

According to still another aspect of the present invention, there is provided a wireless communication system in which a communication apparatus is connected to a relay apparatus, and transmits data to a server apparatus connected via the relay apparatus, the communication apparatus and the relay apparatus comprising: a determination unit adapted to determine whether the communication apparatus or the relay apparatus holds authentication information used in authentication processing required to access the server apparatus; a decision unit adapted to decide, according to a determination result of the determination unit, a transmission method required to transmit the data by controlling an authentication processing unit of the apparatus that holds the authentication information to execute the authentication processing; and a transmission unit adapted to transmit the data by the transmission method decided by the decision unit.

According to the present invention, a system which allows the user to upload an image by operating one of a camera and mobile phone in the system in which the camera and mobile phone are connected, and an image in the camera is uploaded to a Web service, can be provided.

In this case, upload processing can be executed for accounts of Web services managed by both the camera and mobile phone without passing confidential information included in account information between the camera and mobile phone.

Further features of the present invention will become apparent from the following description of exemplary embodiments (with reference to the attached drawings).

BRIEF DESCRIPTION OF THE DRAWINGS

FIG. 4 is a block diagram showing an example of the functional configuration of the relay device according to the first and second embodiments;

FIGS. 11A to 11C are charts for explaining an example of a communication sequence among devices, that is, among the communication device, the relay device, and a server apparatus according to the first embodiment;

FIGS. 12A to 12C are charts for explaining an example of a communication sequence among devices, that is, among the communication device, the relay device, and a server apparatus according to the second embodiment;

Figure 1:
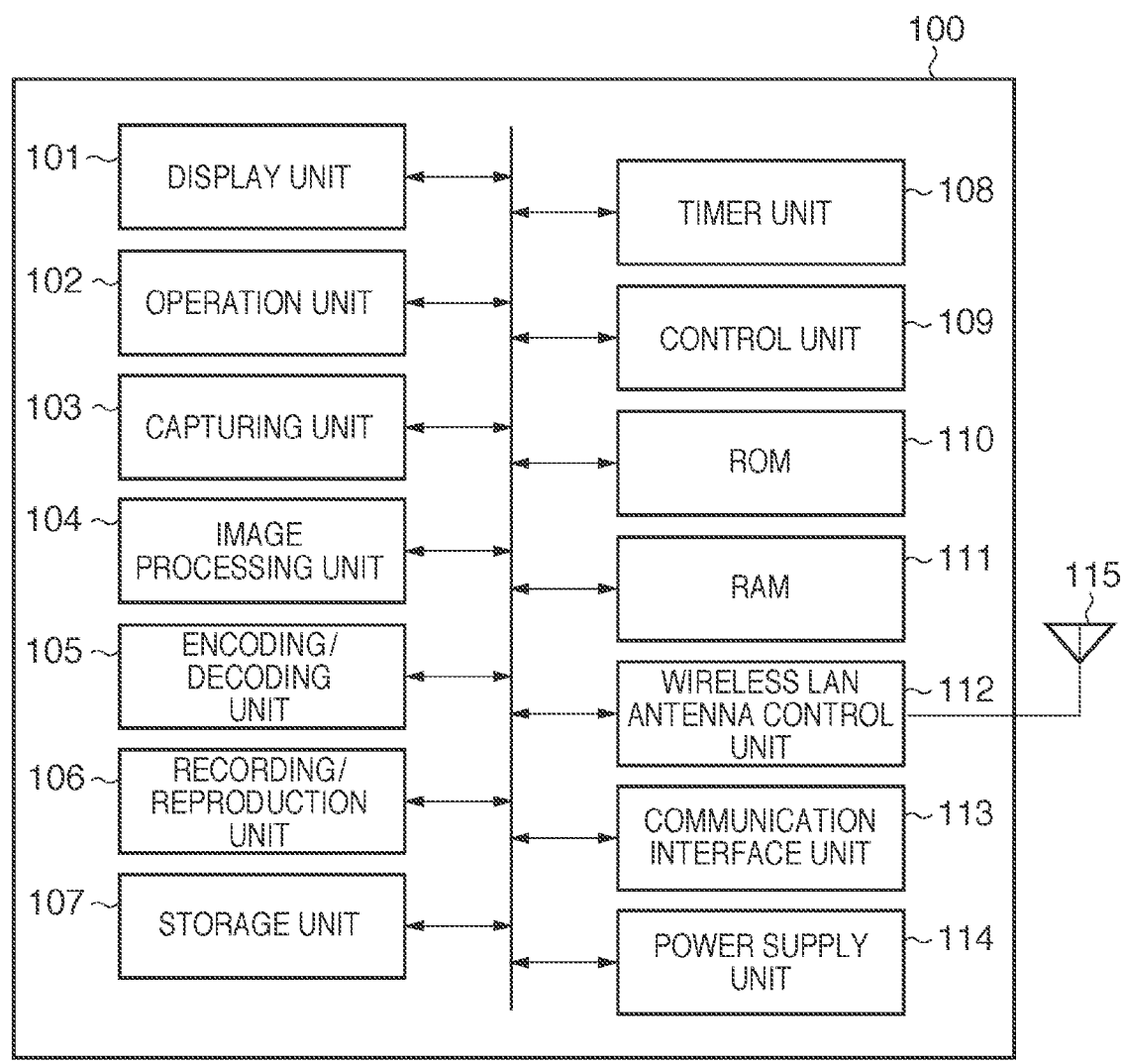
FIG. 1 is a block diagram showing an example of the hardware arrangement of a communication device according to the first and second embodiments.

DESCRIPTION OF THE EMBODIMENTS (First Embodiment)
(Hardware Arrangement of Communication Device)
A communication apparatus (communication device) according to this embodiment will be described in detail below with reference to the drawings. The hardware arrangement of a camera 100 as a communication device according to the embodiment of the present invention will be described below with reference to FIG. 1. A display unit 101 and operation unit 102 serve as a user interface required to, for example, display and execute an application. Whether or not the communication device is operated is determined by checking the presence/absence of an operation input from the operation unit 102. A capturing unit 103 captures an optical image of an object. An image processing unit 104 converts a captured image output from the capturing unit 103 into image data of a predetermined format, and appends a digital watermark to the image data. An encoding/decoding unit 105 applies predetermined high-efficiency encoding (for example, variable-length encoding after DCT transformation and quantization) to the image data output from the image processing unit 104. The encoding/decoding unit 105 expands and decodes compressed image data reproduced from a recording/reproduction unit 106, and supplies that image data to the image processing unit 104. The recording/reproduction unit 106 records/reproduces image data which has undergone compression encoding on/from a recording medium (not shown). The communication device of this embodiment adopts, for example, a JPEG (Joint Photographic Experts Group) method as a technique for compressing and encoding image data. A storage unit 107 stores and manages various data such as wireless communication network information, data transmission/reception information, communication device information, and available service information. A timer unit 108 measures a time. A control unit 109 controls the camera 100. A ROM 110 stores control commands, that is, programs. Reference numeral 111 denotes a RAM. An antenna 115 is used to make a wireless LAN communication. A wireless LAN antenna control unit 112 controls the antenna 115. A communication interface unit (to be referred to as a communication IF hereinafter) 113 executes communication processing including network search, building, connection, and management processes. A power supply unit 114 supplies an electric power to the communication device (communication apparatus).

Figure 2:
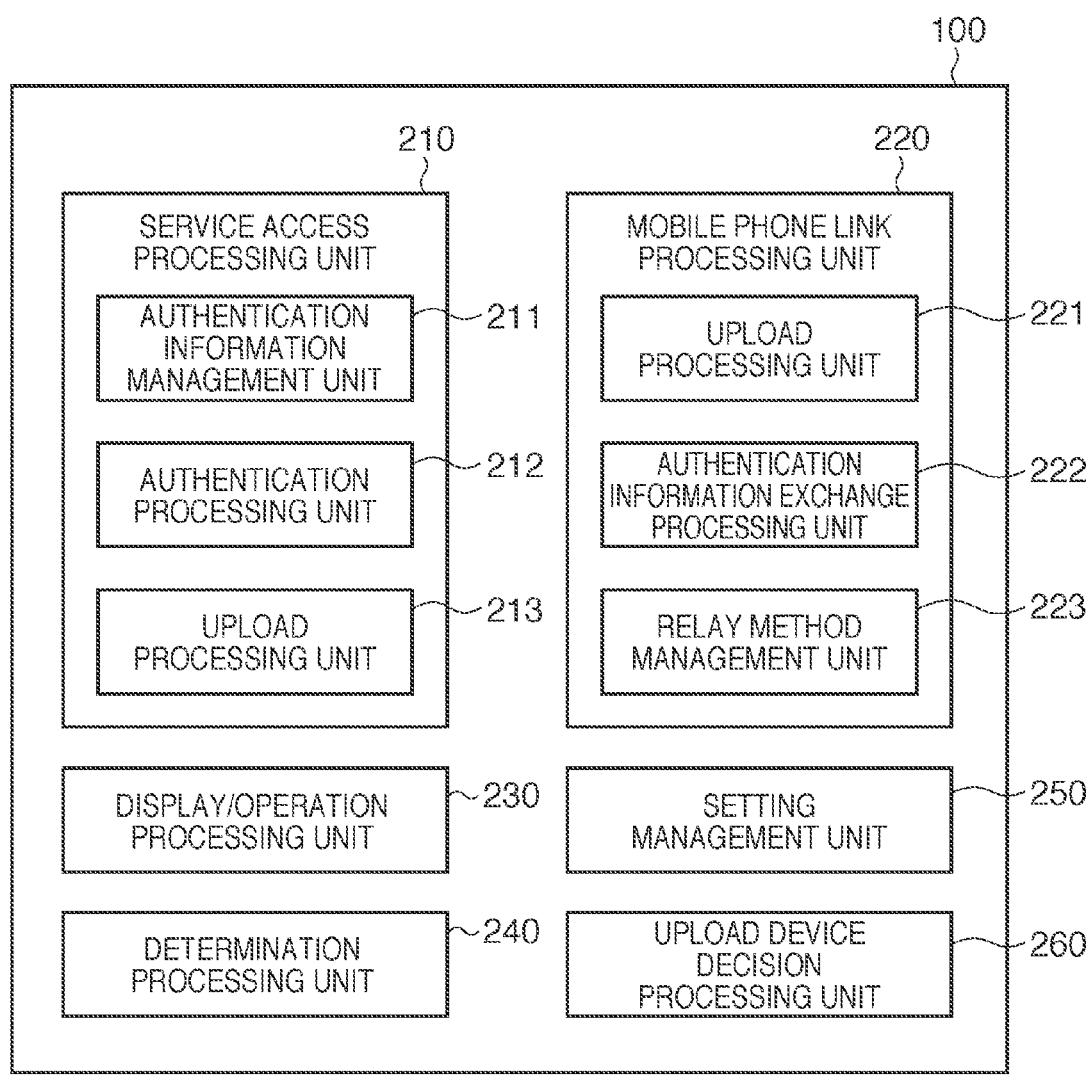
FIG. 2 is a block diagram showing an example of the functional configuration of the communication device according to the first and second embodiments.

(Functional Configuration of Communication Device)
The functional configuration of the communication device will be described below with reference to FIG. 2. In this embodiment, functional blocks of the communication device are stored in the ROM 110 as programs, which are executed by the control unit 109. Note that some or all of the functional blocks of the communication device may be implemented by hardware.

A service access processing unit 210 is a processing unit which incorporates communication protocols required to access a Web service. The service access processing unit 210 exchanges a message, which describes operations defined in a profile published in a WSDL (Web Services Description Language) by a Web service apparatus, with the Web service apparatus. The service access processing unit 210 includes an authentication information management unit 211, authentication processing unit 212, and upload processing unit 213.

The authentication information management unit 211 manages authentication information required to access a Web service. The authentication information managed by the authentication information management unit 211 includes a user name, password, authentication token, and update date. The authentication processing unit 212 executes authentication processing (login and logout processes) for a Web service using the authentication information managed by the authentication information management unit 211. When the login processing has succeeded, the authentication processing unit 212 notifies the authentication information management unit 211 of an authentication token returned from the Web service. The upload processing unit 213 uploads data to the Web service using the authentication token managed by the authentication information management unit 211.

Note that the Web service of this embodiment assumes an image storage service which saves and manages image files and, hence, data to be uploaded is image data. However, the gist of the present invention is not limited to this.

A mobile phone link processing unit 220 is a processing unit which exchanges messages with a mobile phone to exchange data and to issue control requests. The mobile phone link processing unit 220 includes an upload processing unit 221, authentication information exchange processing unit 222, and relay method management unit 223.

The upload processing unit 221 requests the mobile phone to upload image data to the Web service. Also, the upload processing unit 221 requests the service access processing unit 210 to upload an image to the Web service in response to a request from the mobile phone. The authentication information exchange processing unit 222 acquires some pieces of authentication information (user name, update date) from the mobile phone. Also, the authentication information exchange processing unit 222 transmits some pieces of authentication information held by the authentication information management unit 211 to the mobile phone. The relay method management unit 223 monitors whether data relay processing to be executed by the mobile phone is an IP router mode or Proxy mode, and notifies the mobile phone of one of these modes to be executed.

(IP Router Mode and Proxy Mode)

Figures 13A, 13B, 13C:
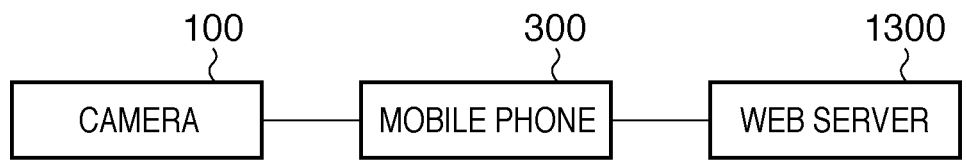
FIG. 13A is a block diagram showing an example of the system arrangement according to the first and second embodiments of the present invention.
FIG. 13B is a table showing an example of authentication information held by the communication device.
FIG. 13C is a table showing an example of authentication information held by the relay device.
Figure 14A:
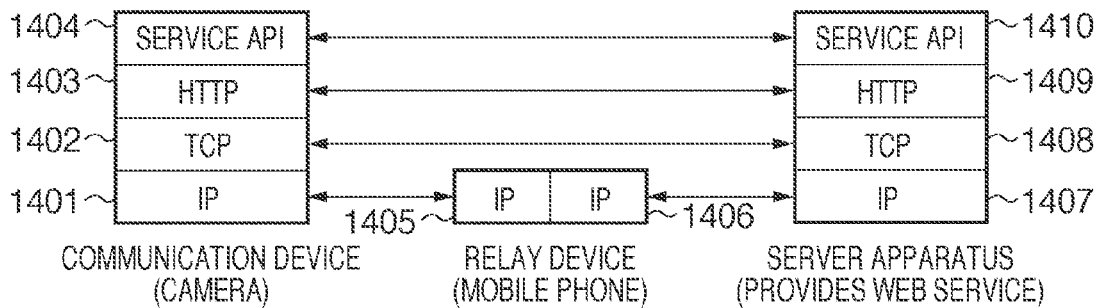
FIGS. 14A and 14B are charts showing examples of communication protocols in an IP router mode.

The IP router mode and Proxy mode will be described in detail below. FIG. 14A is a chart showing an example of communication protocols in the IP router mode. The communication protocols in the camera 100 (FIG. 13A) as a communication device and a Web server 1300 (FIG. 13A) will be described first. Internet protocols 1401 and 1407 handle, for example, IP packets. Transport protocols 1402 and 1408 handle, for example, TCP and UDP packets. Application protocols 1403 and 1409 handle, for example, HTTP packets. Application interface protocols 1404 and 1410 represent APIs required to access a Web service provided by the Web server 1300.

The communication protocols in a mobile phone 300 (FIG. 13A) as a relay device will be described below. In the mobile phone 300, processing protocols 1405 and 1406 implement IP address filtering and address conversion of IP packets. Then, the processing protocols 1405 and 1406 replace the Internet protocol 1401 of the camera 100 by an address which matches the Internet protocol 1407 of the Web server 1300. The remaining transport protocols, application protocols, and application interface protocols implement direct communication protocols between the camera 100 and Web server 1300 without any conversion or analysis of content data.

Figure 14B:
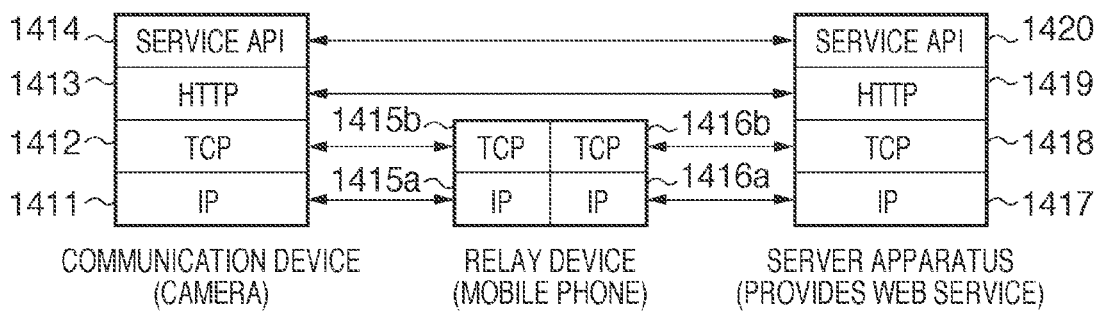

Also, FIG. 14B is a chart showing an example of the communication protocols in the IP router mode according to this embodiment. Since the respective protocols of the camera 100 as a communication device and Web server 1300 are the same as those in FIG. 14A, a description thereof will not be repeated. In the mobile phone 300, a mode generally called a circuit level gateway operates. In this case, an Internet protocol 1415a and transport protocol 1415b, an IP address of the camera 100 as a client is used as a source IP address, and that of the Web server 1300 is used as a destination IP address. Also, in an Internet protocol 1416a and transport protocol 1416b, a circuit level gateway IP address of the mobile phone 300 is used as a source IP address, and an IP address of the Web server 1300 is used as a destination IP address. In this manner, the application protocols and application interface protocols implement direct communication protocols between the camera 100 and Web server 1300 without any conversion or analysis of content data.

Figure 14C:
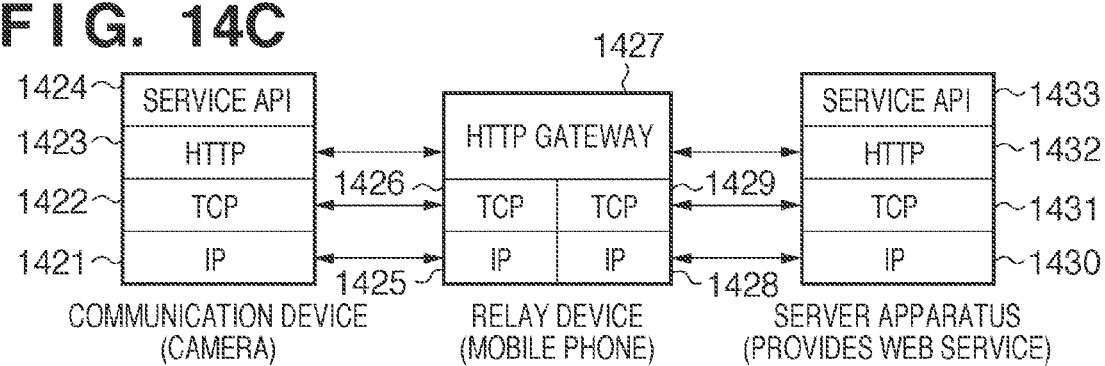
FIGS. 14C and 14D are charts showing examples of communication protocols in a Proxy mode.

FIG. 14C is a chart showing an example of communication protocols in the Proxy mode according to this embodiment. A description of Internet protocols 1421, 1425, 1428, and 1430, and transport protocols 1422, 1426, 1429, and 1431, which are the same as those in FIGS. 14A and 14B, will not be given. In the camera 100 and Web server 1300, application protocols 1423 and 1432 handle, for example, HTTP packets. In this case, the application protocols 1423 and 1432 communicate with an HTTP gateway 1427 of the mobile phone 300.

The HTTP gateway 1427 receives packets transferred via the application protocol 1423 designated by a service-1 API 1424 as an application interface protocol of the camera 100, and analyzes content data. Next, the HTTP gateway 1427 converts the data into packets which are controllable by a service-2 API 1433 as an application interface protocol of the Web server 1300. Subsequently, the packets are transferred to the Web server 1300 via the application procedure 1432. In this case, the HTTP gateway 1427 executes conversion processing of a request from the camera 100, and issues a request to the Web server 1300. Then, the HTTP gateway 1427 receives a response returned from the service-2 API 1433 of the Web server 1300, and returns it to the camera 100 after conversion processing. In this way, since the HTTP gateway 1427 as an application unit of the mobile phone 300 executes data analysis and conversion, the camera 100 and Web server 1300 can exchange communication data.

Figure 14D:
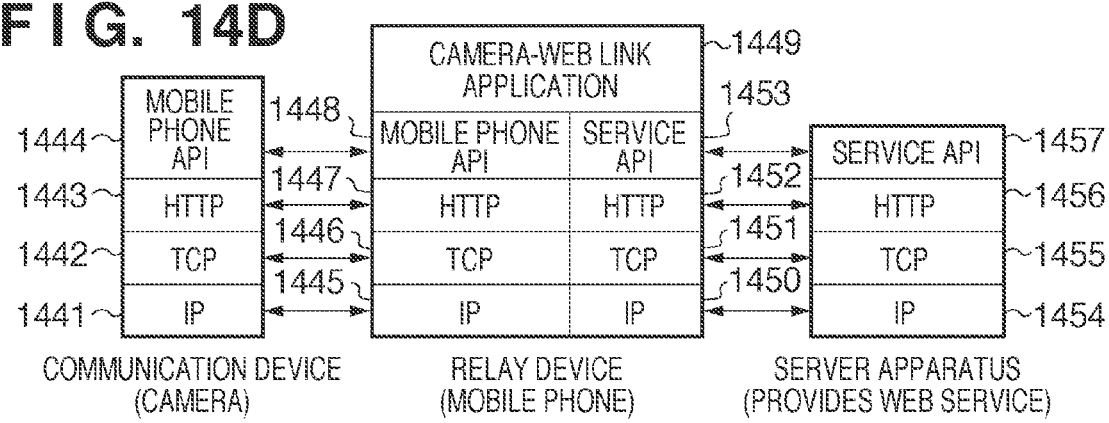

Also, FIG. 14D is a chart showing an example of communication protocols in the Proxy mode according to this embodiment. In this case, differences from FIGS. 14A, 14B, and 14C will be described below. Requests and responses are executed each other between a mobile phone API 1444 of the camera 100 and a mobile phone API 1448 of the mobile phone 300. On the other hand, requests and responses are executed each other between a service API 1457 of the Web server 1300 and a service API 1453 of the mobile phone 300. In this case, the mobile phone APIs and service APIs may operate independently. That is, even when a transmission request of captured image data from the camera 100 is generated in a camera-Web link application 1449, the mobile phone 300 can process the request from the camera in a state in which the mobile phone 300 itself is ready to transmit data to the Web server 1300. For example, the camera 100 and mobile phone 300 can make data communications via the mobile phone API 1444 in a wireless connection state, but the mobile phone 300 cannot often communicate with the Web server 1300 when a wireless communication is out-of-service. In such case, the mobile phone 300 can interrupt an access to the Web server 1300, and can execute data communications with the Web server 1300 via the service APIs when it returns within a service zone.

In this case, the IP router mode and Proxy mode have been exemplified. When the camera 100 as a client accesses the Web server 1300, which provides a Web service, by other means, a connection mode in which the client directly establishes a connection to the server apparatus, may be classified into the IP router mode. On the other hand, when the mobile phone 300 as the relay device accesses the Web server 1300 in place of the client, such mode may be classified into the Proxy mode.

Referring back to FIG. 2, a display/operation processing unit 230 incorporates a function of displaying, for example, images to be uploaded and user names of Web services as upload destinations to the user, and prompting the user to select them. A determination processing unit 240 determines whether a device which holds authentication information corresponding to the user name selected by the display/operation processing unit 230 is the camera or mobile phone. A setting management unit 250 is a functional block which manages various settings associated with the operations of the camera 100.

An upload device decision processing unit 260 decides upload protocols of an image to the Web service based on the determination result by the determination processing unit 240 and the setting information managed by the setting management unit 250. Then, the upload device decision processing unit 260 notifies the service access processing unit 210 and mobile phone link processing unit 220 of the decision result. The upload device decision processing unit 260 determines whether a device which directly accesses the Web service is the camera or mobile phone. Then, the upload device decision processing unit 260 notifies the mobile phone link processing unit 220 of the IP router mode as an operation mode of the mobile phone when the camera accesses the Web service or of the Proxy mode when the mobile phone accesses the Web service. The upload device decision processing unit 260 notifies so that the service access processing unit 210 executes upload processing when the camera accesses the Web service. Also, the upload device decision processing unit 260 notifies so that the mobile phone link processing unit 220 executes upload processing when the mobile phone accesses the Web service.

(Hardware Arrangement of Relay Device)

Figure 3:
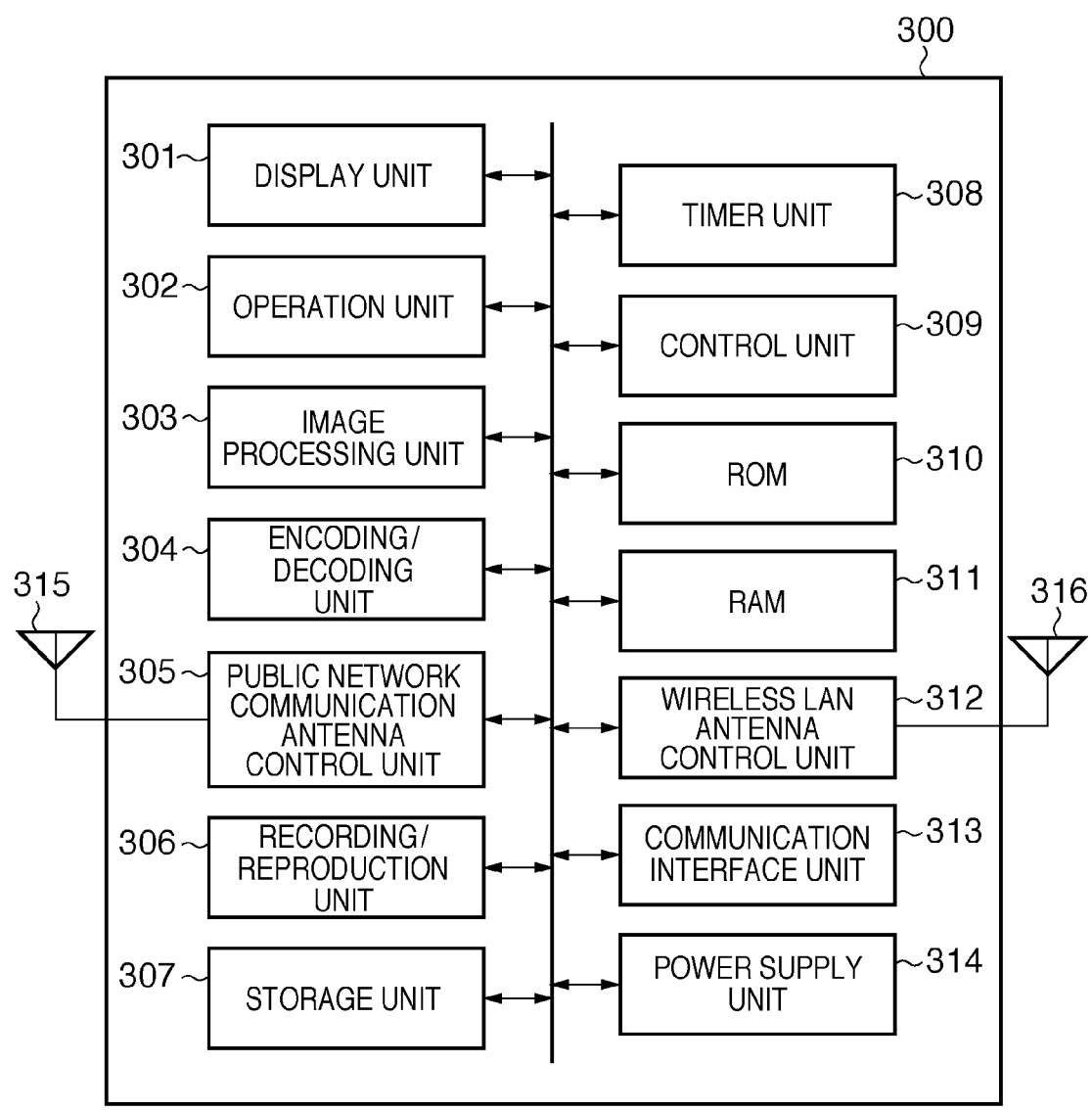
FIG. 3 is a block diagram showing an example of the hardware arrangement of a relay device according to the first and second embodiments.

The relay device according to this embodiment will be described in detail below with reference to the drawings. FIG. 3 is a block diagram showing the hardware arrangement of the relay device according to the embodiment of the present invention. FIG. 3 exemplifies the hardware arrangement of the mobile phone 300 as the relay device. A display unit 301 and operation unit 302 are used to, for example, display and execute an application. Whether or not the relay device is operated is determined by checking the presence/absence of an operation input from the operation unit 302. An image processing unit 303 converts a captured image into image data of a predetermined format. An encoding/decoding unit 304 applies predetermined high-efficiency encoding (for example, variable-length encoding after DCT transformation and quantization) to the image data output from the image processing unit 303. The encoding/decoding unit 304 expands and decodes compressed image data reproduced from a recording/reproduction unit 306, and supplies that image data to the image processing unit 303. The recording/reproduction unit 306 records/reproduces image data which has undergone compression encoding on/from a recording medium (not shown). The relay device of this embodiment adopts, for example, a JPEG (Joint Photographic Experts Group) method as a technique for compressing and encoding image data. A storage unit 307 stores and manages various data such as wireless communication network information, data transmission/reception information, communication device information, and available service information.

A timer unit 308 measures a time. An antenna 315 is used to perform communication with a public network. A public network communication antenna control unit 305 controls the antenna 315. A power supply unit 314 supplies electric power to the relay device.

A control unit 309 controls the mobile phone 300. A ROM 310 stores control commands, that is, programs. Reference numeral 311 denotes a RAM. An antenna 316 is used to make a wireless LAN communication. A wireless LAN antenna control unit 312 controls the antenna 316. A communication interface unit (to be referred to as communication IF hereinafter) 313 executes communication processing including network search, building, connection, and management processes. The communication IF 313 executes processes associated with both public network communications via the antenna 315 and wireless LAN communications via the antenna 316.

(Functional Configuration of Relay Device)

The functional configuration of the relay device will be described below with reference to FIG. 4. In this embodiment, functional blocks of the relay device are stored in the ROM 310 as programs, which are executed by the control unit 309. Note that some or all of the functional blocks of the relay device may be implemented by hardware.

A service access processing unit 410 is a processing unit which incorporates communication protocols required to access a Web service. The service access processing unit 410 includes an authentication information management unit 411, authentication processing unit 412, and upload processing unit 413. The service access processing unit 410 is a processing unit which has functions equivalent to those of the service access processing unit 210 in the camera 100.

A camera link processing unit 420 is a processing unit which exchanges messages with the camera to exchange data and to issue control requests. The camera link processing unit 420 includes an upload processing unit 421, authentication information exchange processing unit 422, and data acquisition processing unit 423. The upload processing unit 421 requests the service access processing unit 410 to upload an image to a Web service requested from the camera in response to a request from the camera. The upload processing unit 421 requests the camera to upload image data to the Web service. The authentication information exchange processing unit 422 acquires some pieces of authentication information (user name, update date) from the camera. The authentication information exchange processing unit 422 transmits some pieces of authentication information held by the authentication information management unit 411 to the camera. The data acquisition processing unit 423 acquires image data from the camera.

A display/operation processing unit 430 incorporates a function of displaying, for example, images to be uploaded and user names of Web services as upload destinations to the user, and prompting the user to select them. A determination processing unit 440 determines whether a device which manages authentication information corresponding to the user name selected by the display/operation processing unit 430 is the camera or mobile phone. A setting management unit 450 is a functional block which manages various settings associated with the operations of the mobile phone 300.

An upload device decision processing unit 460 decides upload protocols of an image to the Web service based on the determination result by the determination processing unit 440 and the setting information managed by the setting management unit 450. Then, the upload device decision processing unit 460 notifies the service access processing unit 410 and camera link processing unit 420 of the decision result. The upload device decision processing unit 460 determines whether a device which directly accesses the Web service is the camera or mobile phone. Then, the upload device decision processing unit 460 notifies a relay method management unit 470 of the IP router mode as an operation mode when the camera accesses the Web service or of the Proxy mode when the mobile phone accesses the Web service. The upload device decision processing unit 460 notifies the camera link processing unit 420 so that the camera link processing unit 420 executes upload processing when the camera accesses the Web service. Also, the upload device decision processing unit 460 notifies the service access processing unit 410, so that the service access processing unit 410 executes upload processing when the mobile phone accesses the Web service.

The relay method management unit 470 manages the IP router mode and Proxy mode as relay operation modes. The relay method management unit 470 controls the communication IF 313 to execute data frame transfer processing (for example, transfer processing based on a bridge function that bridges each data frame of a TCP layer or higher) according to the mode.

The hardware arrangements and functional configurations of the communication device and relay device according to the embodiment of the present invention have been described. Note that the hardware arrangements and functional configurations are examples in the embodiment of the present invention. The present invention is not limited to the illustrated hardware arrangements and functional configurations, and any other hardware arrangements and functional configurations may be adopted as long as they can practice the present invention.

An embodiment as a characteristic feature of the present invention will be described below. FIG. 13A is a block diagram showing the device arrangement of a wireless communication system according to the first embodiment. The camera 100 is connected to the mobile phone 300, and the mobile phone 300 is connected to the Web server 1300. The mobile phone 300 has a function of relaying data communications between the camera 100 and Web server 1300 in the aforementioned IP router mode and Proxy mode. Also, the Web server 1300 has a Web service function (image storage function) available from the camera 100 and mobile phone 300.

FIG. 13B shows pieces of account information of Web services which are managed by the authentication information management unit 211 of the camera 100. User names shown in this table are identifiers which uniquely indicate accounts of Web services. Update dates shown in this table represent dates of creation or updating of corresponding pieces of account information in the camera 100. FIG. 13C shows pieces of account information of Web services which are managed by the authentication information management unit 411 of the mobile phone 300.

(Operation Sequence of Camera 100)

Figure 5A:
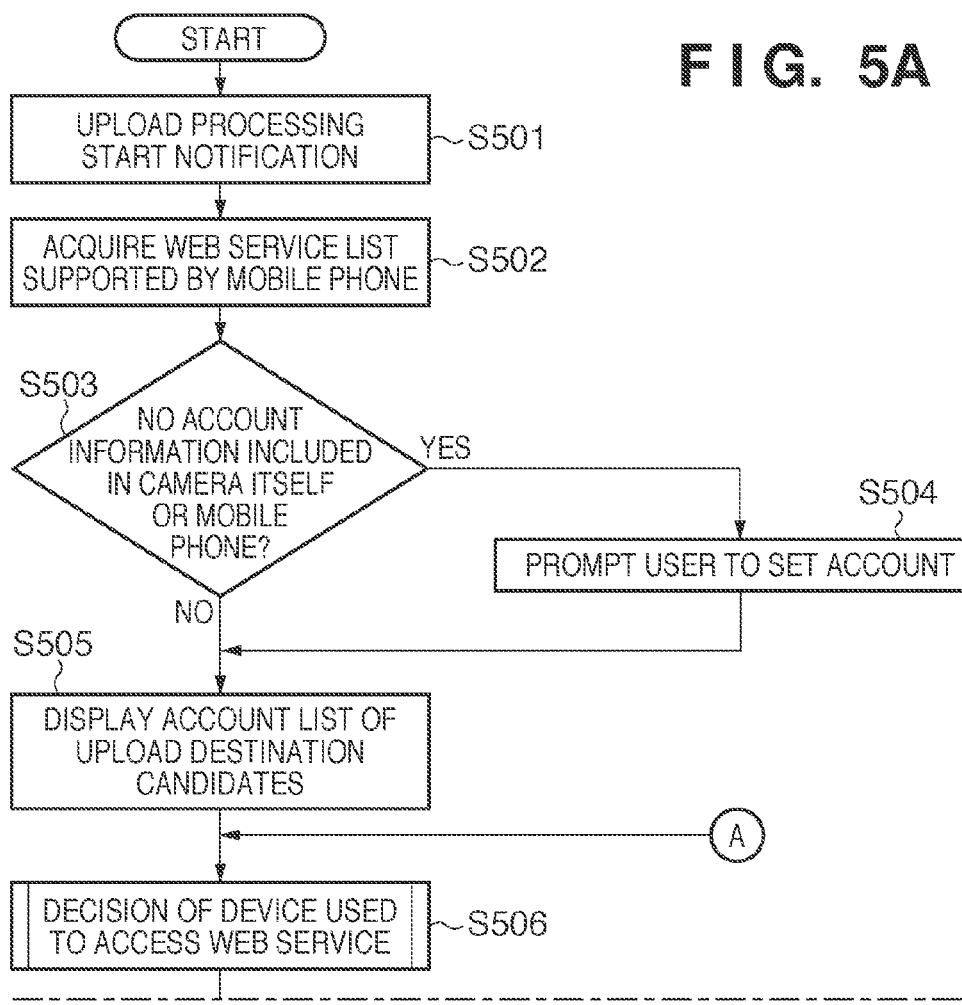
FIGS. 5A and 5B are flowcharts for explaining the operation sequence of the communication device according to the first embodiment.
Figure 5B:
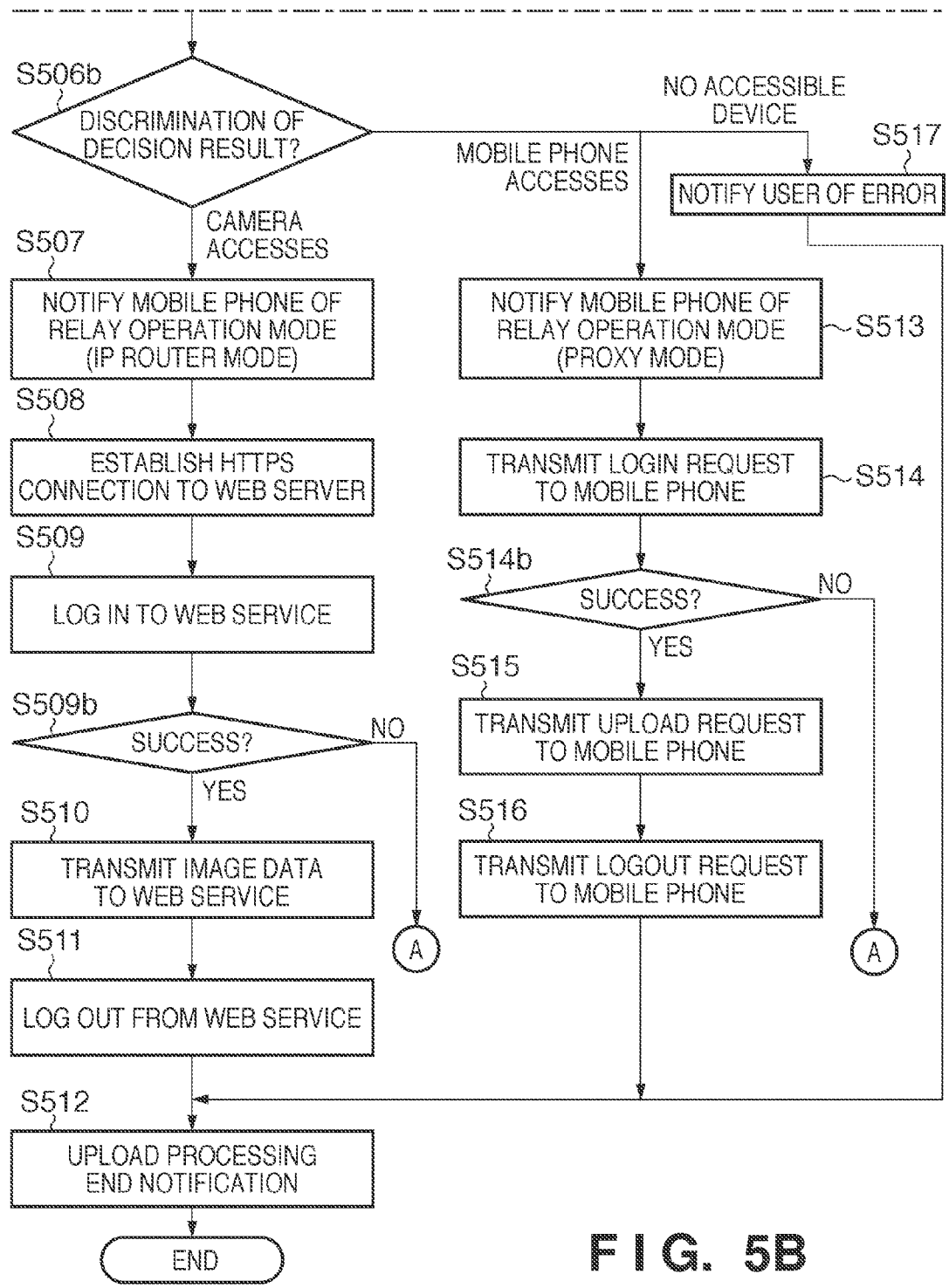

An example of the operation sequence of the camera 100 will be described below with reference to FIGS. 5A and 5B and FIGS. 6A and 6B. FIGS. 5A and 5B are flowcharts showing the operation sequence when image upload processing is executed in the camera 100. This processing is started when the user executes an operation required to start upload processing using the operation unit 102. The operation required to start the upload processing may be a button pressing operation or the upload processing may be started in cooperation with another operation such as a capturing operation. Assume that wireless LAN connection processing between the camera 100 and mobile phone 300 is complete prior to execution of this processing.

When the user executes the operation required to start the upload processing, the upload processing unit 221 transmits an upload processing start notification to the mobile phone 300 (S501). Next, the authentication information exchange processing unit 222 acquires an account information list managed by the mobile phone 300, which list is returned as a response message from the mobile phone 300 (S502). The account information list is a list of user names and account information update dates of the pieces of account information of Web services managed by the mobile phone 300. That is, "suzuki, 2010/4/9"and "tanaka, 2010/4/1" of the account information shown in FIG. 13C are returned from the mobile phone 300. As a result of acquisition of the account information list, it is determined whether or not the camera itself or mobile phone includes account information (S503). If it is determined in step S503 that the camera 100 or mobile phone 300 includes account information, the process advances to step S505. On the other hand, if the camera 100 or mobile phone 300 does not include any account information, the control prompts the user to set an account (S504). In this case, the user may be informed of a message indicating that there is no available account, or the control may automatically transit to an account setting mode. In this embodiment, the account list acquisition processing in step S502 is executed after the upload processing start notification in step S501. However, the account list acquisition processing may be executed first, and when no account information is available as a result of acquisition, the user may be informed of a message indicating that he or she cannot select the upload processing start itself or the upload processing is disabled by changing a display color.

After the account information list is acquired, the display/operation processing unit 230 displays a list of accounts as upload destination candidates of the upload processing on the display unit 101 (S505). In this case, the display/operation processing unit 230 displays, as upload destination candidates, the user names acquired in step S502 and those of account information managed by the authentication information management unit 211, at neighboring positions. That is, in this case, "satou", "suzuki", and "tanaka" are displayed.

When the user selects an image to be uploaded and an account as an upload destination by operating the operation unit 102, the camera 100 decides a device used to access a Web service based on the selected account information (S506). The processing in step S506 is executed by the determination processing unit 240 and upload device decision processing unit 260, and will be described in detail later with reference to FIGS. 6A and 6B.

In step S506b, the decision result in step S506 above is discriminated. As a result of discrimination of step S506, if it is decided that the camera 100 accesses the Web service ("camera accesses" in S506b), the process advances to step S507. The relay method management unit 223 transmits a notification message to the mobile phone 300 to operate relay processing in the IP router mode (S507). When the relay method management unit 223 receives a response message from the mobile phone 300, the authentication processing unit 212 establishes a connection to the Web server 1300 using HTTPS (Hypertext Transfer Protocol Security) (S508). The HTTPS connection is an encrypted communication which is made to assure secrecy for a communication between the camera 100 and Web server 1300, and is used in the login processing (S509) from the camera 100 to the Web service. In order to log in to the Web service, the authentication processing unit 212 transmits a user name and password managed by the authentication information management unit 211 to the Web service using HTTPS. In this case, since the secrecy of the communication is assured by the encrypted communication between the camera 100 and Web server 1300, the user name and password cannot be detected by the mobile phone 300. If the login processing to the Web service has succeeded (YES in S509b), the upload processing unit 213 transmits image data to the Web service (S510). Upon completion of the image upload processing (S510), the authentication processing unit 212 executes logout processing for the Web service (S511), and the upload processing unit 221 transmits an upload processing end notification to the mobile phone 300 (S512).

As a result of discrimination in step S506b, if it is decided that the mobile phone 300 accesses the Web service ("mobile phone accesses" in S506b), the process advances to step S513. The relay method management unit 223 transmits a notification message to the mobile phone 300 to operate the relay processing in the Proxy mode (S513). When the relay method management unit 223 receives a response message from the mobile phone 300, the upload processing unit 221 transmits a login request message for the Web service to the mobile phone 300 (S514). This login request message is transmitted while being appended with a user name associated with the account selected by the user in step S505. The camera 100 checks based on a response message to the login request message whether or not the login processing in the mobile phone 300 has succeeded. If the login processing has succeeded (YES in S514b), the upload processing unit 221 transmits an upload request message to the mobile phone 300 (S515). The upload processing unit 221 transmits image data to be uploaded to the Web service while appending it to the upload request message. If the upload processing (S515) is complete, the upload processing unit 221 transmits a logout request message to the mobile phone 300 (S516), and then transmits an upload processing end notification to the mobile phone 300 (S512).

If the login processing has failed (NO in S509b or S514b), the camera 100 executes the determination processing (S506) in the determination processing unit 240 and upload device decision processing unit 260 again. When both the camera 100 and mobile phone 300 hold account information associated with the user name selected in step S505 ("suzuki" in the examples of FIGS. 13B and 13C), the camera 100 attempts to execute the login processing by changing a device used to access the Web service.

As a result of the determination processing in step S506b, if it is determined that there is no device that can access the Web service ("no accessible device" in S506b), the display/operation processing unit 230 displays an error message (S517). After that, the upload processing unit 221 transmits an upload processing end notification to the mobile phone 300 (S512).

(Detailed Operation of Step S506)

Figure 6A:
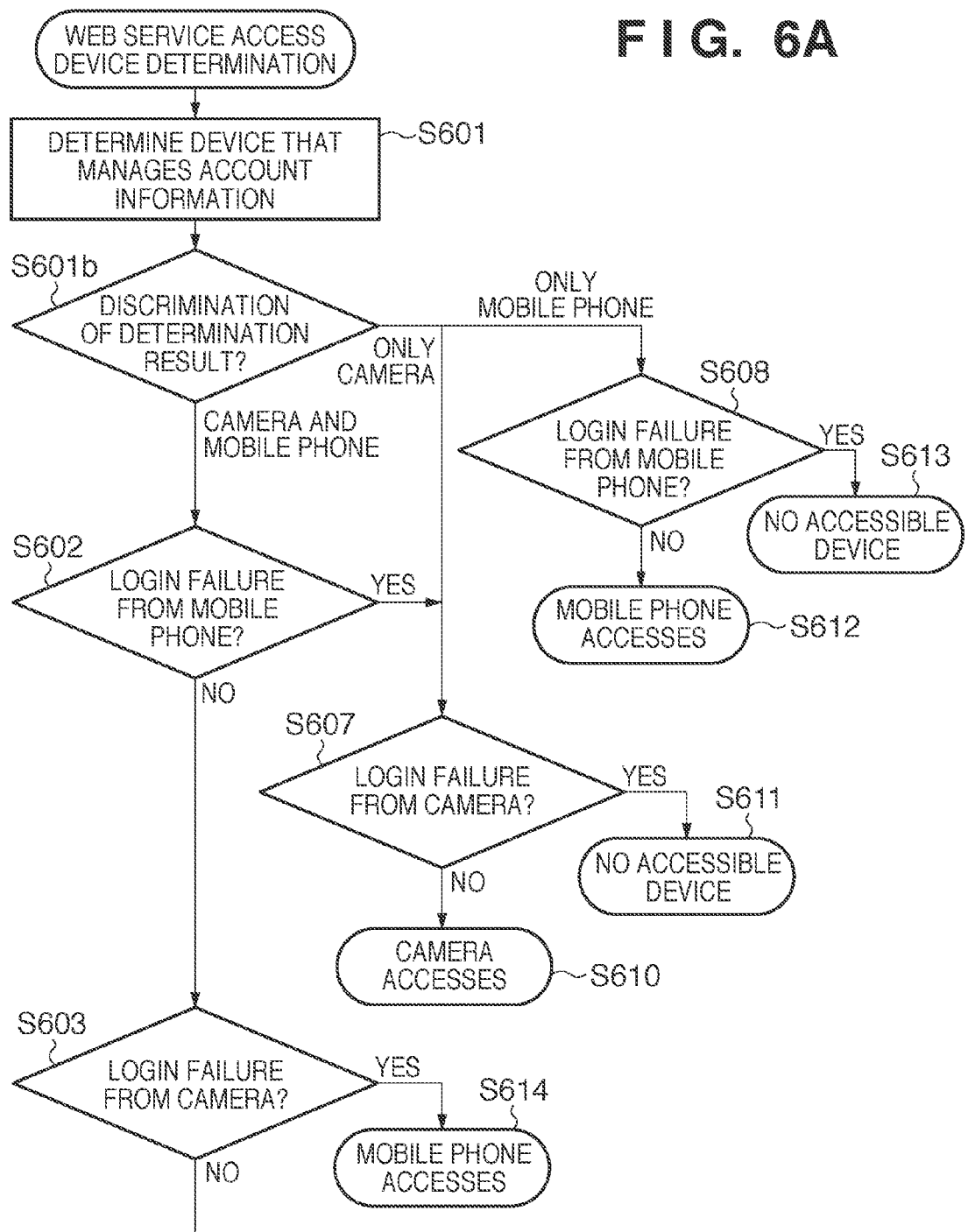
FIGS. 6A and 6B are flowcharts for explaining processing for determining a device used to access a Web service.
Figure 6B:
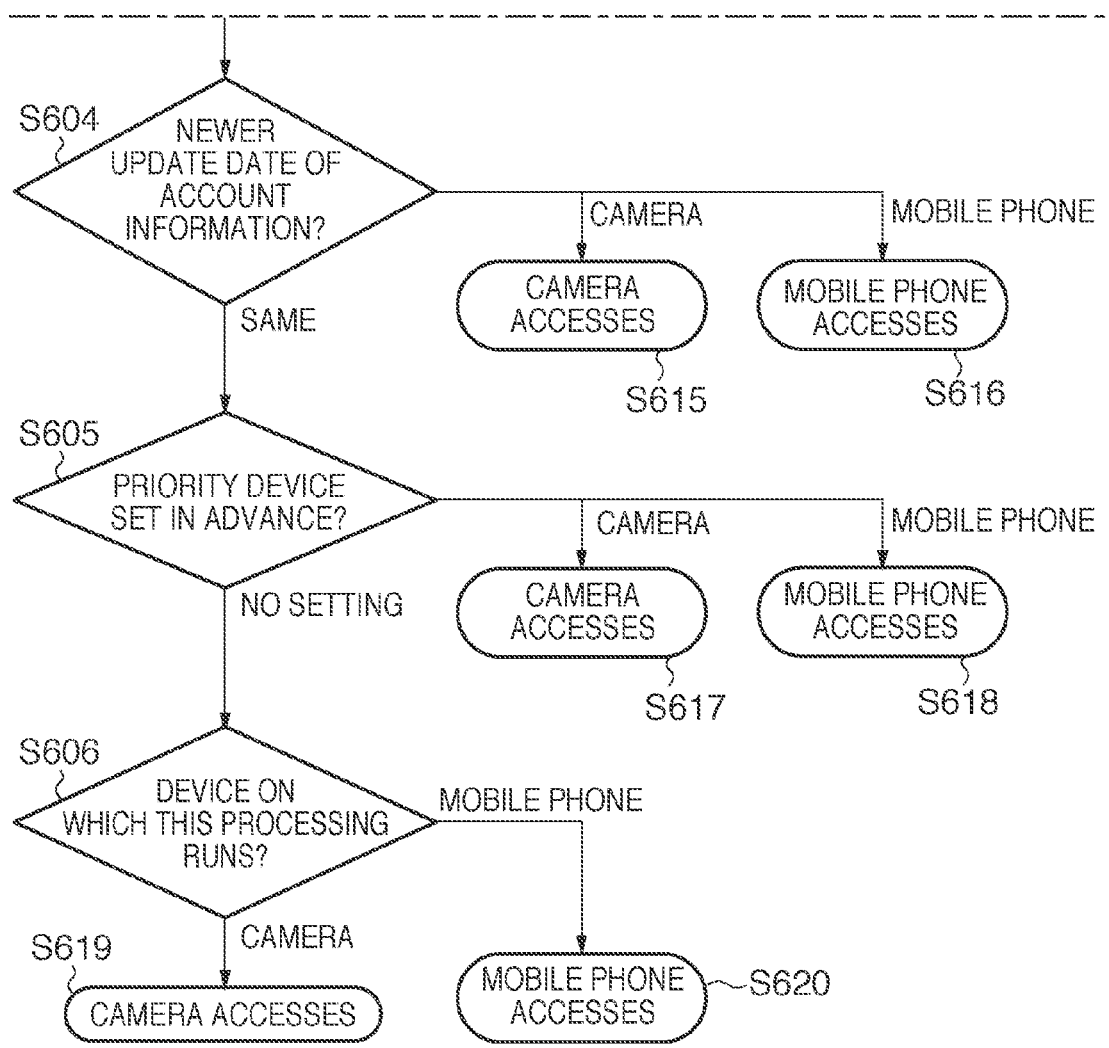

Detailed operations of step S506 will be described below with reference to FIGS. 6A and 6B. Upon deciding a device used to access the Web service, the determination processing unit 240 determines whether a device which manages the account information used in the upload processing is the camera 100 or mobile phone 300 (S601).

As a result of discrimination in step S601b, if only the camera 100 manages the account information ("only camera" in S601b), the process advances to step S607. Then, the camera 100 is selected as the device used to access the Web service (NO in S607, S610). When this processing is called after the login processing by the camera 100 has failed, it is judged that there is no device which can access the Web service (YES in S607, S611).

If only the mobile phone 300 manages the account information ("only mobile phone" in S601b), the process advances to step S608. The mobile phone 300 is selected as the device used to access the Web service (NO in S608, S612). When this processing is called after the login processing by the mobile phone 300 has failed, it is judged that there is no device which can access the Web service (YES in S608, S613).

If both the camera 100 and mobile phone 300 manage the account information ("camera and mobile phone" in S601b), the device used to access the Web service is decided by further checking several conditions (S602 to S606).

When this processing is called after the login processing by the mobile phone 300 has failed, the camera 100 is selected as the device used to access the Web service (YES in S602, NO in S607, S610). When this processing is called after the login processing by the camera 100 has failed, the mobile phone 300 is selected as the device used to access the Web service (YES in S603, S614). When this processing is called after both the login processing by the camera 100 and that by the mobile phone 300 have failed, it is judged that there is no device which can access the Web service (YES in S602, YES in S607, S611).

When the login processing is executed for the first time (NO in S603), the process advances to step S604. In step S604, a device which manages account information of a newer update date is selected as the device used to access the Web service (S604). The camera 100 or mobile phone 300 is selected as the device used to access the Web service according to the comparison result of the update dates of the account information (S615, S616). If the camera 100 and mobile phone 300 have the account information of the same update date based on the comparison result of the update dates of the account information ("same" in S604), when a priority device is set by the setting management unit 250, the set device is selected as the device used to access the Web service (S605). Assume that the setting to be referred to in this case is set by the user by operating the operation unit 102, but a priority order may be set in advance in, for example, the ROM 110. The camera 100 or mobile phone 300 is selected as the device used to access the Web service according to the priority device setting (S617, S618).

If there is no priority device setting in the setting management unit 250 ("no setting" in S605), the process advances to step S606, and the device on which this processing is running is selected as the device used to access the Web service (S606). In the first embodiment, the camera 100 is selected as the device used to access the Web service. In the second embodiment to be described later, the mobile phone 300 is selected as the device used to access the Web service.

(Operation Sequence of Mobile Phone 300)

Figure 7:
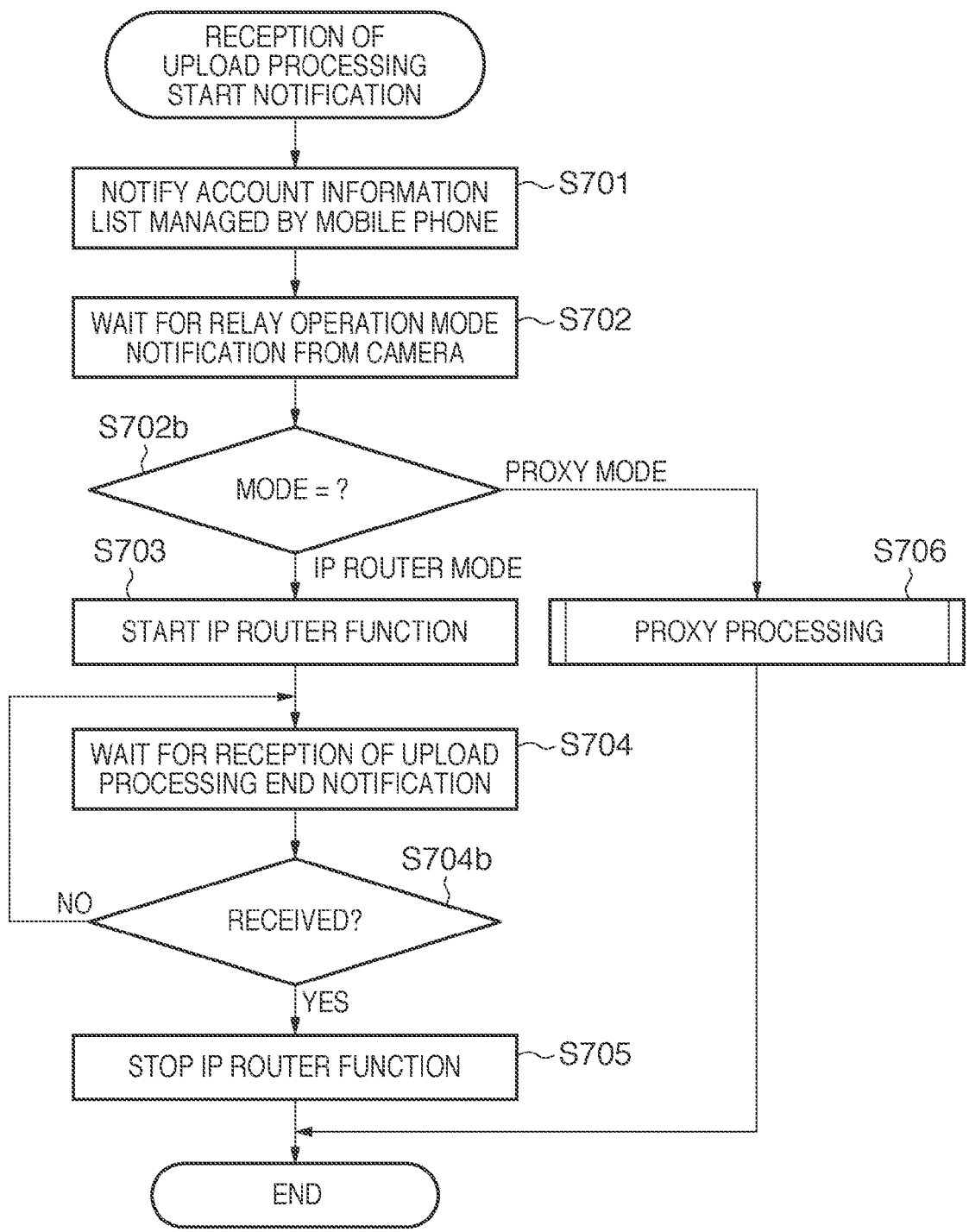
FIG. 7 is a flowchart for explaining the operation sequence of the relay device according to the first embodiment.
Figure 8:
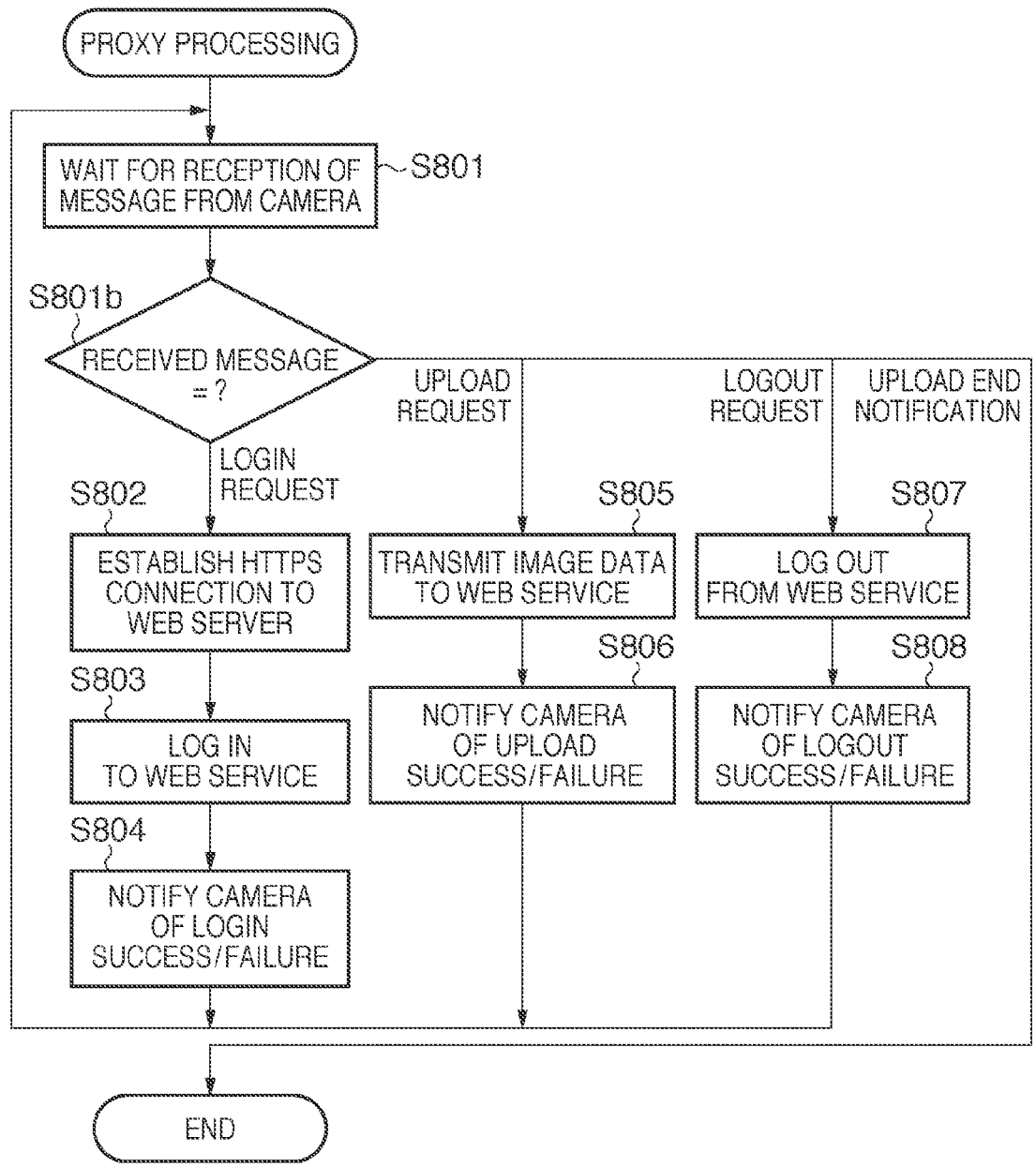
FIG. 8 is a flowchart for explaining the operation sequence of the relay device according to the first embodiment.

An example of the operation sequence of the mobile phone 300 will be described below with reference to FIGS. 7 and 8. FIG. 7 is a flowchart showing the operation sequence of the mobile phone 300 when the user executes upload processing using the camera 100. This processing is started when the upload processing unit 421 receives an upload processing start notification from the camera 100. Assume that the wireless LAN connection processing between the camera 100 and mobile phone 300 is complete prior to execution of this processing.

When the upload processing unit 421 receives the upload processing start notification from the camera 100, the authentication information exchange processing unit 422 transmits some pieces of account information managed by the authentication information management unit 411 to the camera 100 (S701). That is, the some pieces of account information to be transmitted in this step correspond to the list of user names and update dates of the account information (FIG. 13C) managed by the authentication information management unit 411. That is, the authentication information exchange processing unit 422 transmits "suzuki, 2010/4/9" and "tanaka, 2010/4/1" of the account information shown in FIG. 13C to the camera 100.

Upon completion of transmission of the account information, the upload processing unit 421 waits for a notification message which is transmitted from the camera 100 and designates the relay mode (S702). In step S702b, the relay mode designated in the notified message is determined.

If the relay operation in the IP router mode is instructed from the camera 100 ("IP router mode" in S702b), the process advances to step S703, and the relay method management unit 470 starts the relay operation in the IP router mode (S703). In this case, in this embodiment, assume that the operation shown in FIG. 14A is made as the IP router mode.

During the operation in the IP router mode, the mobile phone 300 serves as a gateway from the camera 100 with respect to the Internet (a network to which the Web server 1300 is connected). The mobile phone 300 terminates a part of an IP layer or lower of each packet which is transmitted from the camera 100 to the Internet, and allows a part of a TCP layer or higher to pass through itself. During the operation in the IP router mode, the upload processing unit 421 waits for an upload processing end notification from the camera 100 (S704). If the upload processing end notification is received (YES in S704b), the relay method management unit 470 stops the relay operation in the IP router mode (S705). Note that when the operation shown in FIG. 14B is made as the IP router mode, the same effects can be obtained.

On the other hand, if the relay operation in the Proxy mode is instructed from the camera 100 ("Proxy mode" in S702b), the process advances to step S706. The relay method management unit 470 starts the relay operation in the Proxy mode (S706). In this case, in this embodiment, assume that the operation shown in FIG. 14D is made as the Proxy mode.

(Detailed Operation of Step S706)

Detailed processing of step S706 will be described below with reference to FIG. 8. During the relay operation in the Proxy mode, the upload processing unit 421 waits for a message from the camera 100 (S801).

Upon reception of a login request message from the camera 100 ("login request" in S801b), the process advances to step S802. The authentication processing unit 412 establishes a connection to the Web server 1300 using HTTPS (S802). Next, the authentication processing unit 412 acquires a password from the authentication information management unit 411 using the user name of the upload destination account received by the login request as a key, and executes login processing for the Web service using these user name and password (S803). Upon completion of the login processing, the upload processing unit 421 notifies the camera 100 of the login processing result (success/failure) (S804).

Upon reception of an upload request message from the camera 100 ("upload request" in S801b), the process advances to step S805. The upload processing unit 413 uploads image data received by the upload request message to the Web service (S805). Upon completion of the upload processing to the Web service, the upload processing unit 421 notifies the camera 100 of the upload processing result (success/failure) (S806).

Upon reception of a logout request message from the camera 100 ("logout request" in S801b), the process advances to step S807. The authentication processing unit 412 executes logout processing for the Web service (S807). Upon completion of the logout processing for the Web service, the upload processing unit 421 notifies the camera 100 of the logout processing result (success/failure) (S808).

Upon reception of an upload end notification message from the camera 100 ("upload end notification" in S801b), the upload processing unit 421 ends the message waiting operation from the camera 100, thus ending the operation as the Proxy mode. Note that when the operation shown in FIG. 14C is made as the Proxy mode, the same effects can be obtained.

(Communication Sequence Among Devices)

Figure 11C:
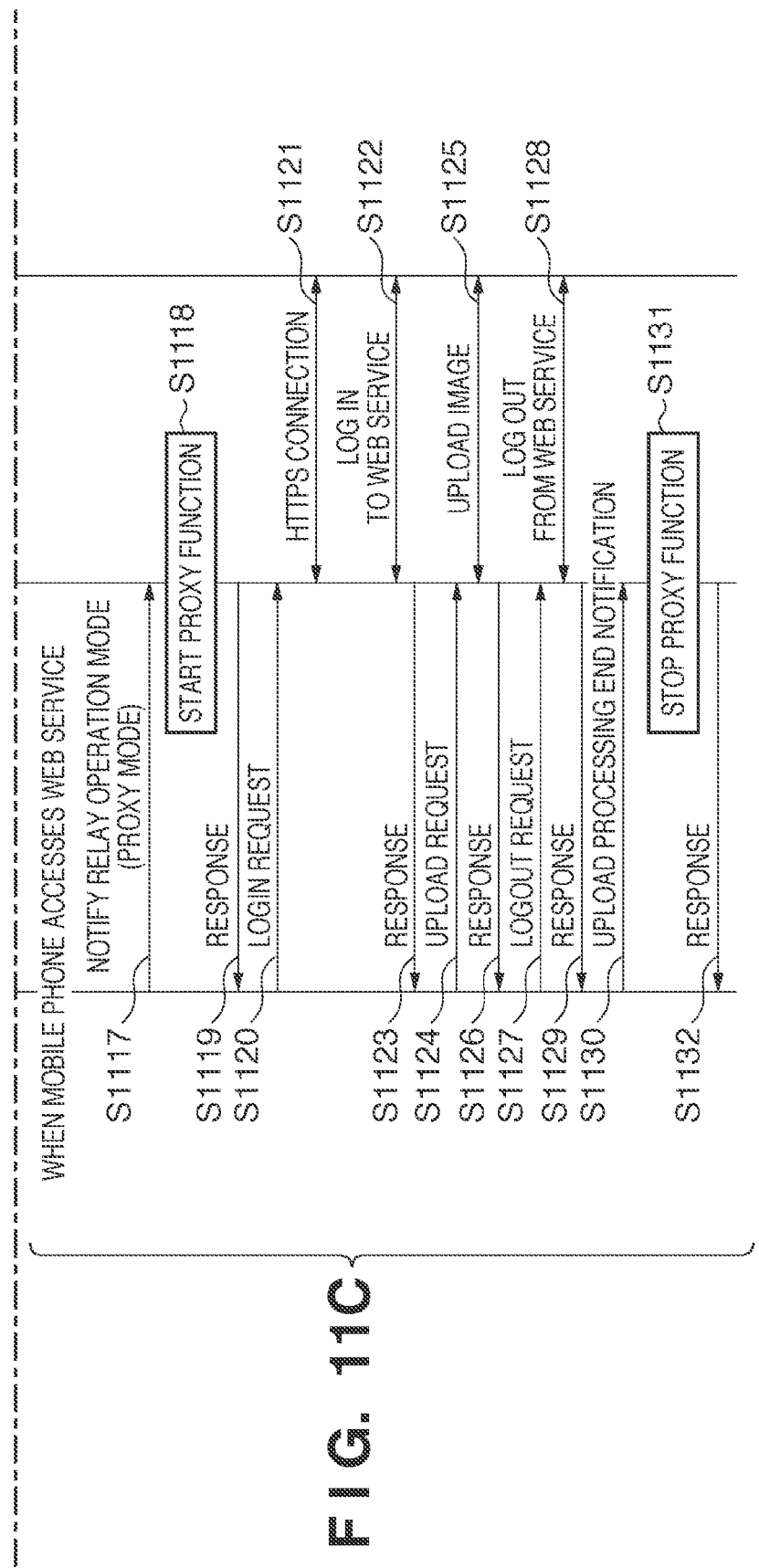

An example of the communication sequence among the devices, that is, among the camera 100, mobile phone 300, and Web server 1300 (server apparatus) will be explained below with reference to FIGS. 11A to 11C. FIGS. 11A to 11C are charts showing an example of the communication sequence executed when the user uploads image data stored in the camera 100 to the Web service provided by the Web server 1300 via the mobile phone 300 by operating the camera 100.

Assume that a wireless LAN connection between the camera 100 and mobile phone 300 has already been established as an initial state. The user makes an operation required to start upload processing at the camera 100 (S1101). When the operation required to start the upload processing is made, the camera 100 transmits an upload processing start notification message to the mobile phone 300 (S1102). In response to this message, the mobile phone 300 transmits, to the camera 100, a response message including the list of pieces of account information, which are managed by itself (S1103). Upon acquisition of the account information list, the camera 100 displays a list of accounts as upload destination candidates of the upload processing to the display unit 101, and prompts the user to select an account (S1104). The upload destination candidates displayed in this case are obtained by combining the user names acquired in step S1103 and those of the account information managed by the camera 100. When the user selects an account as an upload destination by operating the camera 100 (S1105), the camera 100 decides a device used to access the Web service (S1106). The processing in step S1106 is that shown in FIGS. 6A and 6B.

(When Camera 100 Accesses Web Service (FIG. 11B))

As a result of the processing in step S1106, when it is decided that the camera 100 accesses the Web service, the camera 100 transmits a notification message to the mobile phone 300 to execute relay processing in the IP router mode (S1107). In response to this message, the mobile phone 300 starts the relay processing in the IP router mode (S1108), and transmits a response message to the camera 100 (S1109). Upon reception of the response message, the camera 100 establishes a connection to the Web server 1300 using HTTPS (S1110). Subsequently, the camera 100 logs in to the Web service (S1111), uploads image data to the Web service (S1112), and logs out from the Web service (S1113). Upon completion of the logout processing from the Web service (S1113), the camera 100 transmits an upload processing end notification message to the mobile phone 300 (S1114). In response to this message, the mobile phone 300 stops the relay processing in the IP router mode (S1115), and transmits a response message to the camera 100 (S1116).

(When Mobile Phone 300 Accesses Web Service (FIG. 11C))

As a result of the processing in step S1106, when it is decided that the mobile phone 300 accesses the Web service, the camera 100 transmits a notification message to the mobile phone 300 to execute relay processing in the Proxy mode (S1117). In response to this message, the mobile phone 300 starts the relay processing in the Proxy mode (S1118, FIG. 8), and transmits a response message to the camera 100 (S1119). Upon reception of the response message, the camera 100 transmits a login request message to the mobile phone 300 (S1120). The camera 100 transmits this login request message appended with a user name associated with the account, which is selected by the user in step S1105. Upon reception of the login request message, the mobile phone 300 establishes a connection to the Web server 1300 using HTTPS (S1121). Then, the mobile phone 300 executes login processing for the Web service (S1122), and transmits the processing result to the camera 100 (S1123). Next, the camera 100 transmits an upload request message appended with image data to be uploaded to the mobile phone 300 (S1124). Upon reception of the upload request message, the mobile phone 300 acquires the image data appended to the message, uploads this image data to the Web service (S1125), and transmits the upload processing result to the camera 100 (S1126). Upon reception of a response message of the upload processing, the camera 100 transmits a logout request message to the mobile phone 300 (S1127). Upon reception of the logout request message, the mobile phone 300 executes logout processing for the Web service (S1128), and transmits the processing result to the camera 100 (S1129). Upon completion of the logout processing, the camera 100 transmits an upload processing end notification to the mobile phone 300 (S1130). Upon reception of the upload processing end notification, the mobile phone 300 stops the relay processing in the Proxy mode (S1131), and transmits a response message to the camera 100 (S1132). Upon reception of a response message of the upload processing end notification (S1116, S1132), the camera 100 ends a series of image upload processes.

(Second Embodiment)

The first embodiment has described the embodiment in which the user operates a camera to upload image data to a Web service. The following second embodiment will explain an embodiment in which the user operates a mobile phone to upload image data in the camera to a Web service using the same device arrangement as in the first embodiment. As in the first embodiment, in the second embodiment, an IP router mode is that shown in FIG. 14A or 14B, and a Proxy mode is that shown in FIG. 14C or 14D.

In the second embodiment, the hardware arrangements and functional configurations are the same as the hardware arrangements (FIGS. 1 and 3) and functional configurations (FIGS. 2 and 4) of the first embodiment, and a description thereof will not be repeated. In the second embodiment, the arrangement of a wireless communication system and account information are the same as the arrangement of the wireless communication system (FIG. 13A) and account information (FIGS. 13B and 13C) of the first embodiment, and a description thereof will not be repeated.

(Operation Sequence of Mobile Phone 300)

Figure 9A:
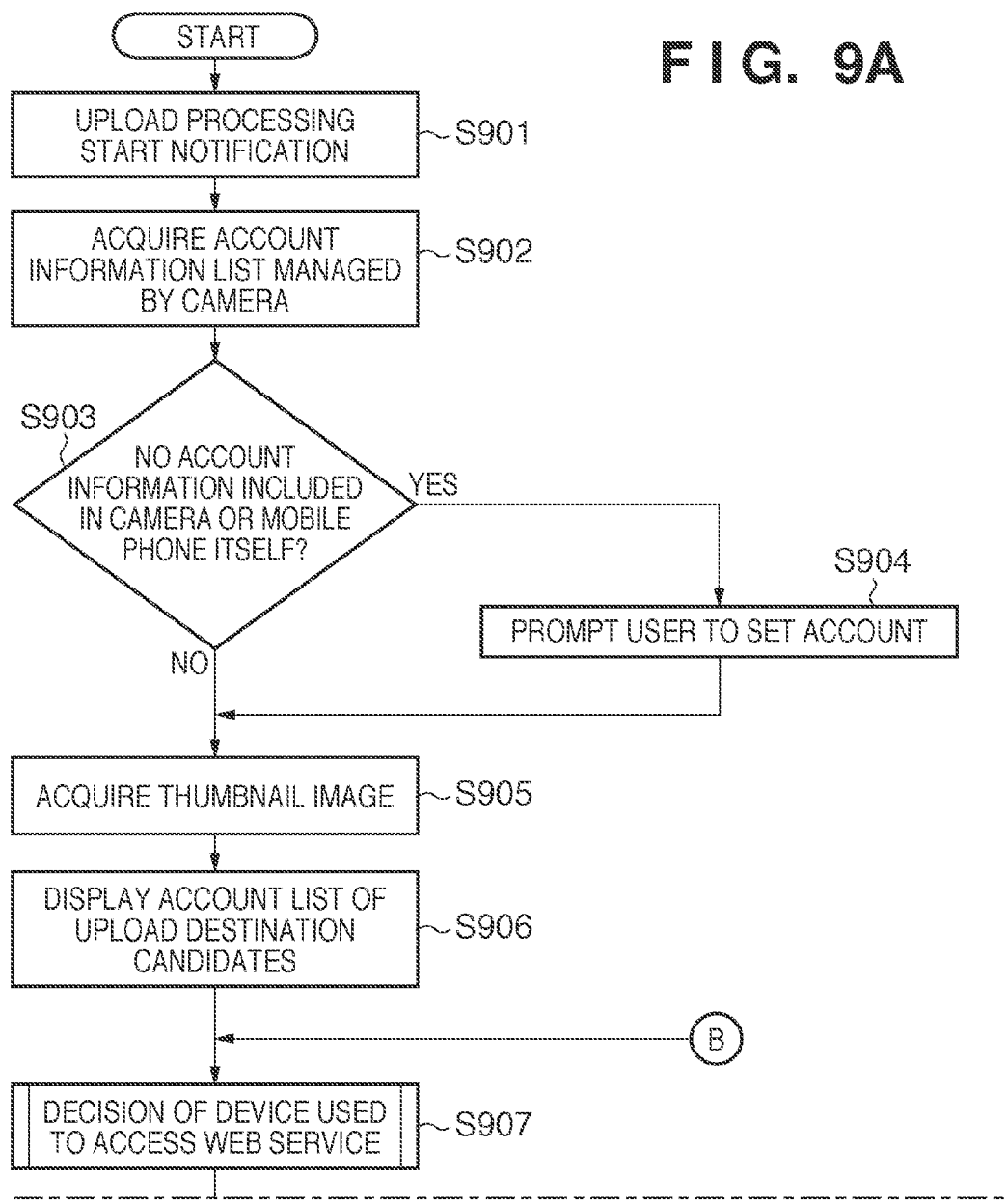
FIGS. 9A and 9B are flowcharts for explaining the operation sequence of the relay device according to the second embodiment.
Figure 9B:
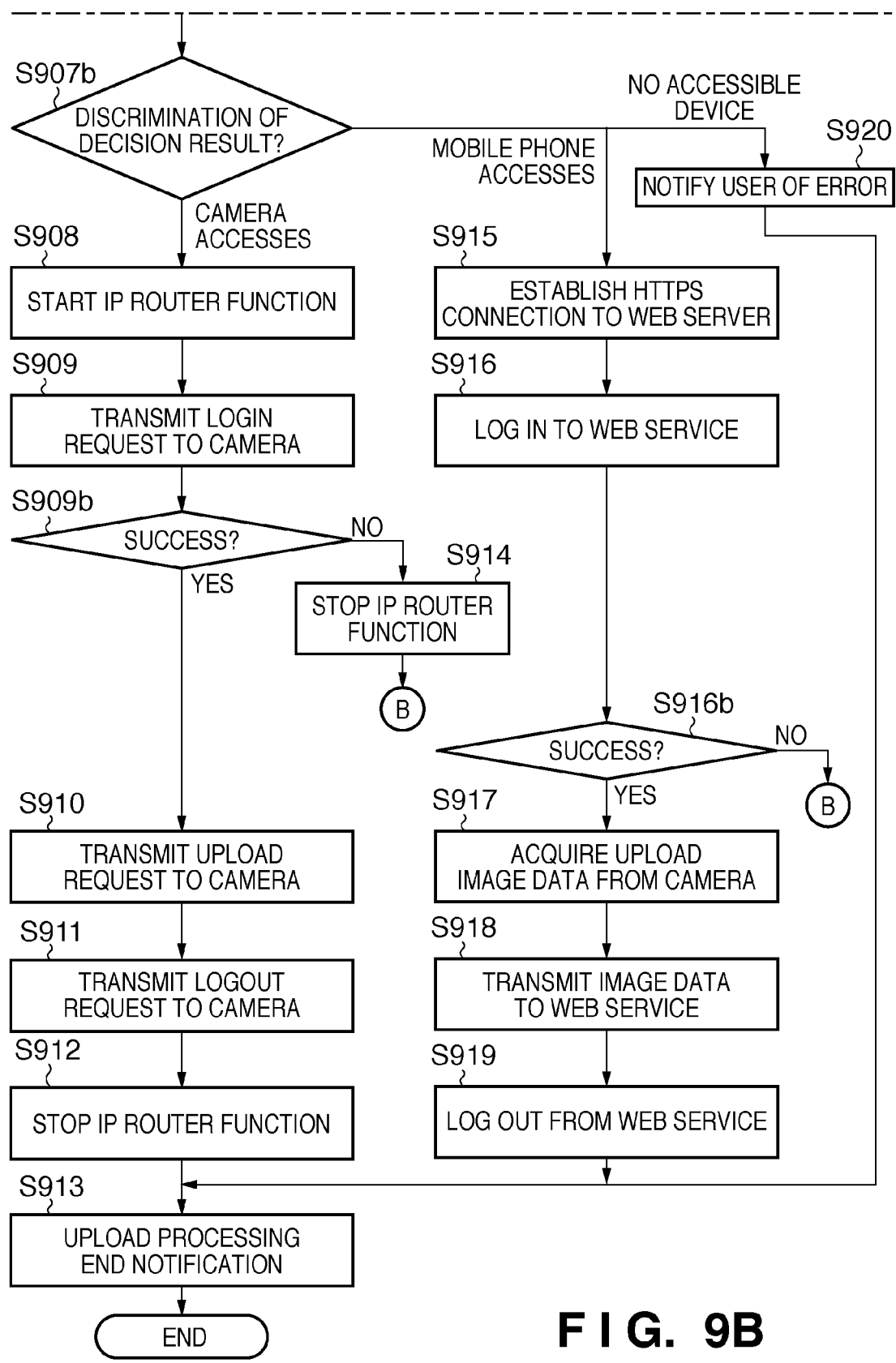

The operation sequence at the time of execution of image upload processing in a mobile phone 300 will be described below with reference to FIGS. 9A and 9B. This processing is started when the user makes an operation required to start upload processing using an operation unit 302. Assume that wireless LAN connection processing between a camera 100 and the mobile phone 300 is complete prior to execution of this processing.

When the operation required to start the upload processing is made, an upload processing unit 421 transmits an upload processing start notification to the camera 100 (S901). Next, an authentication information exchange processing unit 422 acquires an account information list which is returned as a response message from the camera 100 and is managed by the camera 100 (S902). The account information list is a list of user names and account information update dates of the account information of Web services managed by the camera 100. That is, "satou, 2010/1/1" and "suzuki, 2010/3/15" of the account information shown in FIG. 13B are transmitted from the camera 100. As a result of acquisition of the account information list, it is determined whether or not the camera or mobile phone itself includes account information (S903). If the camera 100 or mobile phone 300 includes the account information, the process advances to step S905. On the other hand, if it is determined in step S903 that the camera 100 or mobile phone 300 does not include any account information, the control prompts the user to set an account (S904). In this case, the user may be informed of a message indicating that there is no available account, or the control may automatically transit to an account setting mode. In this embodiment, the account list acquisition processing in step S902 is executed after the upload processing start notification in step S901. However, the account list acquisition processing may be executed first, and when no account information is available as a result of acquisition, the user may be informed of a message indicating that he or she cannot select the upload processing start itself or the upload processing is disabled by changing a display color.

After the account information list is acquired, a data acquisition processing unit 423 acquires a list of thumbnails of images to be uploaded from the camera 100 (S905). A display/operation processing unit 430 displays a list of accounts as upload destination candidates of the upload processing and a list of the thumbnail images acquired in step S905 on a display unit 301 (S906). In this case, the display/operation processing unit 430 displays, as upload destination candidates, the user names acquired in step S902 and those of account information managed by the authentication information management unit 411, at neighboring positions. That is, in this case, "satou", "suzuki", and "tanaka" are displayed.

When the user selects an image to be uploaded and an account of an upload destination by operating the operation unit 302, the mobile phone 300 decides a device used to access a Web service based on the selected account information (S907). The processing in step S907 is the same as that (S506) of FIGS. 6A and 6B described in the first embodiment, and a description thereof will not be repeated. In step S907*b*, the decision result in step S907 above is discriminated. As a result of determination in step S907, if it is decided that the camera 100 accesses the Web service ("camera accesses" in S907*b*), the process advances to step S908. A relay method management unit 470 starts a relay operation in the IP router mode (S908). Assume that in this embodiment, the operation shown in FIG. 14A is made as the IP router mode.

During the operation in the IP router mode, the mobile phone 300 serves as a gateway from the camera 100 with respect to the Internet (a network to which a Web server 1300 is connected). The mobile phone 300 terminates a part of an IP layer or lower of each packet which is transmitted from the camera 100 to the Internet, and allows a part of a TCP layer or higher to pass through itself.

When a communication in the IP router mode is started, the upload processing unit 421 transmits a login request message for the Web service to the camera 100. The upload processing unit 421 transmits this login request message appended with a user name associated with the account, which is selected by the user in step S906. Upon reception of this login request, the camera 100 executes login processing (to be described later) for the Web service. However, the mobile phone 300 merely transfers (passes through) data for a part of a TCP layer or higher of each data frame exchanged between the camera 100 and Web server 1300, and does not detect any data contents.

Subsequently, the upload processing unit 421 transmits a login request message for the Web service to the camera 100 (S909). The upload processing unit 421 transmits this login request message appended with the user name associated with the account, which is selected by the user in step S906. The mobile phone 300 judges based on a response message to the login request message whether login processing in the camera 100 has succeeded or failed.

If the login processing has succeeded (YES in S909*b*), the upload processing unit 421 transmits an upload request message to the camera 100 (S910). The upload processing unit 421 transmits the upload request message appended with an identifier of an image, which is selected by the user in step S906, and is to be uploaded to the Web service. Upon completion of the upload processing (S910), the upload processing unit 421 transmits a logout request message to the camera 100 (S911). After that, the relay method management unit 470 stops the IP router function (S912), and the upload processing unit 421 transmits an upload processing end notification to the camera 100 (S913).

On the other hand, if it is detected that the login processing has failed (NO in S909b), the relay method management unit 470 stops the IP router function (S914), and a determination processing unit 440 and upload device decision processing unit 460 execute the determination processing in step S907 again. When the mobile phone 300 also holds account information associated with the user name selected in step S906 ("suzuki" in the examples of FIGS. 13B and 13C), it attempts to execute login processing by changing a device used to access the Web service to the mobile phone 300.

As a result of discrimination in step S907, if it is decided that the mobile phone 300 accesses the Web service ("mobile phone accesses" in S907b), the process advances to step S915. An authentication processing unit 412 establishes a connection to the Web server 1300 using HTTPS (S915). Upon completion of the HTTPS connection, the authentication processing unit 412 transmits a user name and password managed by the authentication information management unit 411 to the Web service using HTTPS, and executes login processing for the Web service (S916). When the login processing for the Web service has succeeded (YES in S916b), the data acquisition processing unit 423 transmits an upload image request message to the camera 100, and acquires image data of an image to be uploaded to the Web service from the camera 100 (S917). Upon completion of acquisition of the image data, an upload processing unit 413 transmits the image data to the Web service (S918). Upon completion of the image upload processing (S918), the authentication processing unit 412 executes logout processing for the Web service (S919), and the upload processing unit 421 transmits an upload processing end notification to the camera 100 (S913).

On the other hand, if the login processing has failed (NO in S916b), the determination processing unit 440 and upload device decision processing unit 460 execute the determination processing in step S907 again. When the camera 100 also holds account information associated with the user name selected in step S906, the mobile phone 300 attempts to execute login processing by changing the device used to access the Web service to the camera 100.

As a result of the determination processing in step S907, if it is determined that there is no device which can access the Web service ("no accessible device" in S907b), the process advances to step S920, and the display/operation processing unit 430 displays an error message (S920). After that, the upload processing unit 421 transmits an upload processing end notification to the camera 100 (S913).

(Operation Sequence of Camera 100)

Figure 10:
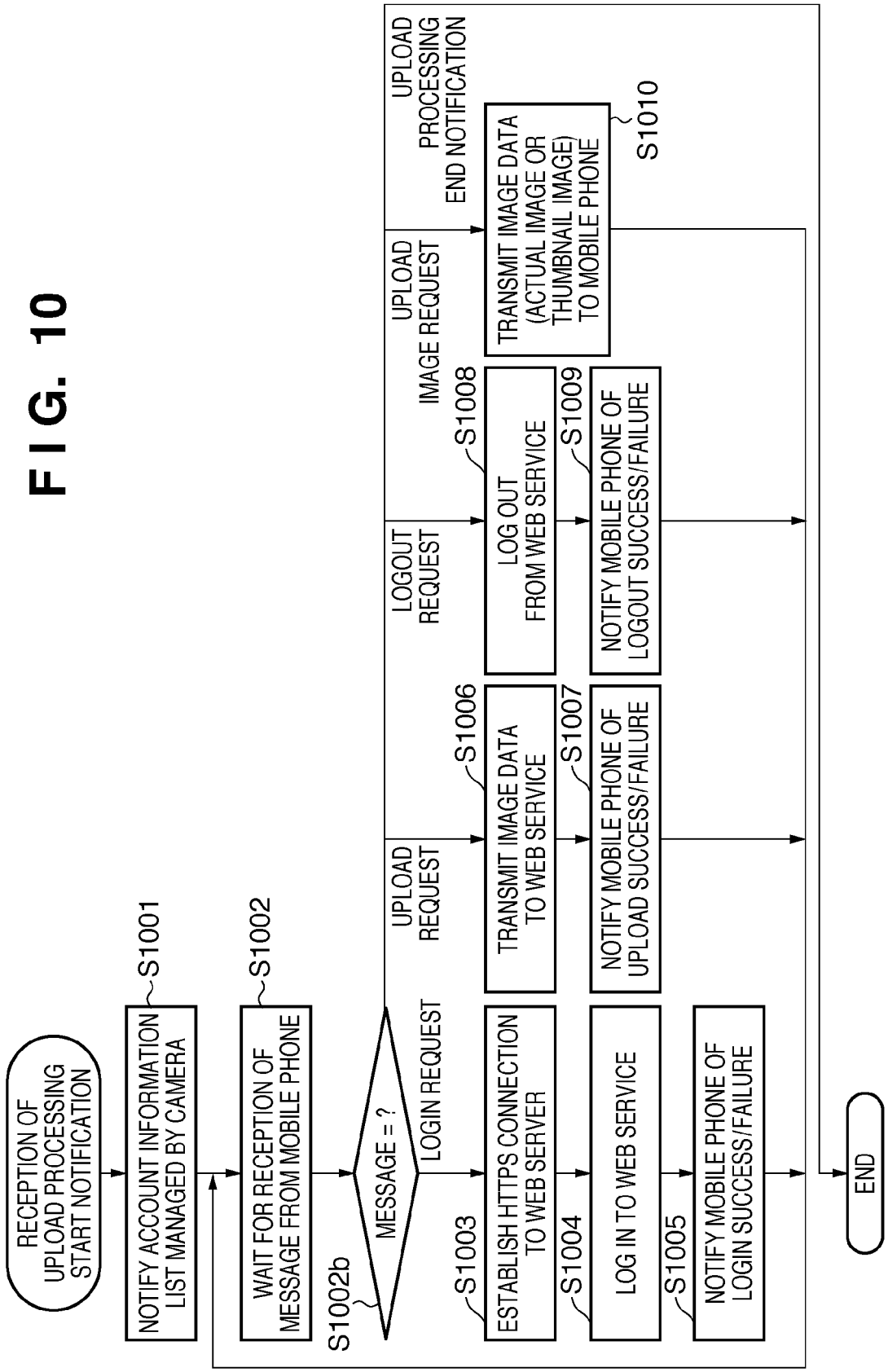
FIG. 10 is a flowchart for explaining the operation sequence of the communication device according to the second embodiment.

The operation sequence of the camera 100 when the user executes the upload processing using the mobile phone 300 will be described below with reference to FIG. 10. This processing is started when an upload processing unit 221 receives an upload processing start notification from the mobile phone 300. Assume that wireless LAN connection processing between the camera 100 and mobile phone 300 is complete prior to execution of this processing.

When the upload processing unit 221 receives the upload processing start notification from the mobile phone 300, an authentication information exchange processing unit 222 transmits some pieces of account information managed by an authentication information management unit 211 to the mobile phone 300 (S1001). The account information to be transmitted in this step corresponds to a list of user names and update dates of the account information (FIG. 13B) managed by the authentication information management unit 211. That is, the authentication information exchange processing unit 222 transmits "satou, 2010/1/1" and "suzuki, 2010/3/15" of the account information shown in FIG. 13B to the mobile phone 300. Upon completion of transmission of the account information, the upload processing unit 221 waits for a notification message transmitted from the mobile phone 300 (S1002).

Upon reception of a login request message from the mobile phone 300 ("login request" in S1002b), the process advances to step S1003. An authentication processing unit 212 establishes a connection to the Web server 1300 using HTTPS (S1003). Next, the authentication processing unit 212 acquires a password from the authentication information management unit 211 using the user name of the upload destination account received by the login request as a key, and executes login processing for a Web service using these user name and password (S1004). Upon completion of the login processing, the upload processing unit 221 notifies the mobile phone 300 of the login processing result (success/failure) (S1005).

Upon reception of an upload request message from the mobile phone 300 ("upload request" in S1002b), the process advances to step S1006. An upload processing unit 213 uploads data of an image indicated by an image identifier received by the upload request message to the Web service (S1006). Upon completion of the upload processing to the Web service, the upload processing unit 221 notifies the mobile phone 300 of the upload processing result (success/failure) (S1007).

Upon reception of a logout request message from the mobile phone 300 ("logout request" in S1002b), the process advances to step S1008, and the authentication processing unit 212 executes logout processing for the Web service (S1008). Upon completion of the logout processing for the Web service, the upload processing unit 221 notifies the mobile phone 300 of the logout processing result (success/failure) (S1009).

Upon reception of an upload image request message from the mobile phone 300 ("upload image request" in S1002b), the process advances to step S1010. The upload processing unit 221 transmits image data designated by the upload image request message to the mobile phone 300 (S1010). The upload image request message designates a type (actual image or thumbnail) of image data, and an identifier (file name, all images, etc.) of an image to be acquired, and the upload processing unit 221 transmits data corresponding to this to the mobile phone 300.

Upon reception of an upload end notification message from the mobile phone 300 ("upload end notification" in S1002b), the upload processing unit 221 ends the message waiting operation from the mobile phone 300.

(Communication Sequence among Devices)

An example of the communication sequence among the devices, that is, among the camera 100, mobile phone 300, and Web server 1300 will be explained below with reference to FIGS. 12A to 12C. FIGS. 12A to 12C are charts showing an example of the communication sequence executed when the user uploads image data stored in the camera 100 to the Web service provided by the Web server 1300 via the mobile phone 300 by operating the mobile phone 300.

Assume that a wireless LAN connection between the camera 100 and mobile phone 300 has already been established as an initial state. The user makes an operation required to start upload processing at the mobile phone 300 (S1201). When the operation required to start the upload processing is made, the mobile phone 300 transmits an upload processing start notification message to the camera 100 (S1202). In response to this message, the camera 100 transmits, to the mobile phone 300, a response message including a list of pieces of account information, which are managed by itself (S1203). Subsequently, the mobile phone 300 transmits an upload image request message to the camera 100, and requests the camera 100 to transmit thumbnail data of images held by the camera 100 (S1204). The camera 100 transmits a list of thumbnail data of images held by itself and identifiers of the images to the mobile phone 300 (S1205). Upon acquisition of the account information list and thumbnail data list, the mobile phone 300 displays a list of the acquired thumbnail images and accounts as upload destination candidates of upload processing on the display unit 301, and prompts the user to select them (S1206). The upload destination candidates displayed in this case are obtained by combining the user names acquired in step S1203 and those of the account information managed by the mobile phone 300. When the user selects an image to be uploaded and an account as an upload destination by operating the mobile phone 300 (S1207), the mobile phone 300 decides a device used to access a Web service (S1208). The processing in step S1208 is that shown in FIGS. 6A and 6B.

(When Camera 100 Accesses Web Service (FIG. 12B))

As a result of the processing in step S1208, when it is decided that the camera 100 accesses the Web service, the mobile phone 300 starts relay processing in the IP router mode (S1209). Subsequently, the mobile phone 300 transmits a login request message to the camera 100 (S1210). The mobile phone 300 transmits this login request message appended with a user name associated with the account, which is selected by the user in step S1207. The camera 100 establishes a connection to the Web server 1300 using HTTPS (S1211), executes login processing for the Web service (S1212), and transmits the processing result to the mobile phone 300 (S1213). Next, the mobile phone 300 transmits an upload request message which designates an identifier of an image to be uploaded to the camera 100 (S1214). The camera 100 uploads actual image data of the image designated by the message to the Web service (S1215), and transmits the upload processing result to the mobile phone 300 (S1216). Upon reception of a response message of the upload processing, the mobile phone 300 transmits a logout request message to the camera 100 (S1217). Upon reception of the logout request message, the camera 100 executes logout processing for the Web service (S1218), and transmits the processing result to the mobile phone 300 (S1219). Upon reception of a response message to the logout request, the mobile phone 300 stops the relay processing in the IP router mode (S1220), and transmits an upload processing end notification to the camera 100 (S1221). The camera 100 returns a response message to the upload processing end notification to the mobile phone 300 (S1222). Note that when the operation shown in FIG. 14B is made as the IP router mode, the same effects can be obtained.

(When Mobile Phone 300 Accesses Web Service (FIG. 12C))

As a result of the processing in step S1208, when it is decided that the mobile phone 300 accesses the Web service, the mobile phone 300 establishes a connection to the Web server 1300 using HTTPS (S1223). Subsequently, the mobile phone 300 executes login processing for the Web service (S1224). When the login processing has succeeded, the mobile phone 300 transmits an upload image request message to the camera 100, and requests the camera 100 to transmit actual image data of the image selected in step S1207 (S1225). The camera 100 transmits actual image data of the image designated by the upload image request message to the mobile phone 300 (S1226). In response to this, the mobile phone 300 uploads the received image data to the Web service (S1227), and executes logout processing (S1228) after completion of the upload processing. Upon completion of the logout processing, the mobile phone 300 transmits an upload processing end notification to the camera 100 (S1229), and the camera 100 transmits a response message to that notification to the mobile phone 300 (S1230).

(Modifications)

The components described in the aforementioned first and second embodiments are presented for the exemplary purpose only, and the technical scope of the present invention is settled by the scope of the appended claims, but is not limited by each individual embodiment. For example, in the first and second embodiments, as a means for allowing each frame data to pass through the mobile phone, the operation of an IP router which terminates an IP layer has been exemplified. However, the gist of the present invention is not limited to this. Each frame data associated with upload processing, which is exchanged between the camera and Web service, need only be passed through the mobile phone. More specifically, each frame need only be passed through the mobile phone while the mobile phone is not allowed to analyze confidential information included in that frame data associated with the authentication processing. Hence, such processing may be implemented using, for example, a technique such as SOCKS proxy. Alternatively, this processing may be implemented using NAT (Network Address Translation), which replaces a local IP address used in a communication between the camera and mobile phone by a global IP address used in a communication between the mobile phone and Web server. Furthermore, an operation may be made to pass through each frame of an IP layer or higher (to terminate a part of a MAC layer or lower).

In the first and second embodiments, all of the login processing, upload processing, and logout processing for the Web service are executed by either the camera or mobile phone. However, the gist of the present invention is not limited to this. For example, the scope of the present invention also includes an embodiment in which the login processing and logout processing are executed by the camera, and the upload processing is executed by the mobile phone.

In the first and second embodiments, the camera and mobile phone are connected via the wireless LAN. However, the gist of the present invention is not limited to this. For example, the camera and mobile phone may be connected via a wireless communication such as Bluetooth® or an infrared communication or a wired communication such as a wired LAN or USB.

In the first and second embodiments, the mobile phone and Web server are connected via a public communication network and the Internet. However, the gist of the present invention is not limited to this. For example, the scope of the present invention also includes a connection mode in which the mobile phone establishes a connection to an access point using a wireless LAN communication, and is connected to the Web server via a local network to which the access point belongs.

In the first and second embodiments, the relay processing mode in the mobile phone is designated by a message from the camera. However, the gist of the present invention is not limited to this. For example, the mobile phone may always operate in the Proxy mode, and the camera may notify the mobile phone only when the mobile phone is to operate in the IP router mode.

According to the embodiments of the present invention or their modifications, a wireless communication system, which allows the user to upload an image by operating one of the camera or mobile phone, can be provided.

In this case, upload processing to an account of a Web service managed by both the camera and mobile phone can be executed without notifying confidential information included in account information between the camera and mobile phone.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-171175, filed Jul. 29, 2010, which is hereby incorporated by reference herein in its entirety.

What is claimed is:

1. A communication apparatus, comprising:
   control unit comprising:
   a first determination unit configured to determine whether said communication apparatus holds authentication information for using image sharing services or a relay apparatus, which relays communication between said communication apparatus and a server apparatus providing the image sharing services, holds the authentication information;
   a second determination unit configured to determine, based on a determination result of said first determination unit, whether said communication apparatus transmits image data using the image sharing services to the server apparatus or said communication apparatus causes the relay apparatus to transmit the image data to the server apparatus;
   a transmission unit configured to:
   1) transmit the image data to the server apparatus as a transmission destination in a case where said second determination unit determines that said communication apparatus transmits the image data to the server apparatus; and
   2) transmit the image data to the relay apparatus as a transmission destination in a case where said second determination unit determines that said communication apparatus causes the relay apparatus to transmit the image data to the server apparatus; and
   a request unit configured to request the relay apparatus to transmit the image data to the server apparatus in a case where said second determination unit determines that said communication apparatus causes the relay apparatus to transmit the image data to the server apparatus,
   wherein said request unit does not request a transmission of the image data in a case where said second determination unit determines that said communication apparatus transmits the image data to the server apparatus.

2. The apparatus according to claim 1, wherein the control unit further comprises an authentication unit configured to perform authentication processing using the authentication information with the server apparatus in a case where said second determination unit determines that said communication apparatus transmits the image data to the server apparatus,
   wherein said transmission unit transmits the image data to the server apparatus after authentication processing by said authentication unit.

3. The apparatus according to claim 2, wherein the communication apparatus performs the authentication processing by performing an encrypted communication with the server apparatus.

4. The apparatus according to claim 1, the control unit further comprising a decision unit configured to decide one of a bridge function which bridges a data frame of not lower than a TCP layer, NAT (Network Address Translation) function, or SOCKS proxy function as an operation to be executed by the relay apparatus.

5. The apparatus according to claim 1, the control unit further comprising a comparison unit configured to compare an update date of the authentication information held by said communication apparatus with an update date of the authentication information held by the relay apparatus in a case where said determination unit determines that both said communication apparatus and the relay apparatus hold the authentication information,
   wherein said second determination unit:
   1) determines, in a case where said communication apparatus holds the authentication information having newer update date based on a comparison result of said comparison unit, that said communication apparatus transmits the image data to the server apparatus; and
   2) determines, in a case where the relay apparatus holds the authentication information having newer update date based on a comparison result of said comparison unit, that said communication apparatus causes the relay apparatus to transmit the image data to the server apparatus.

6. The apparatus according to claim 1, wherein in a case where said first determination unit determines that both said communication apparatus and the relay apparatus hold the authentication information, said second determination unit determines, based on a priority order which is set in advance, whether said communication apparatus transmits the image data to the server apparatus or said communication apparatus causes the relay apparatus to transmit the image data to the server apparatus.

7. The apparatus according to claim 1, the control unit further comprising:
   a display unit configured to display pieces of the authentication information held by at least one of said communication apparatus and the relay apparatus; and
   a selection unit configured to select one of the pieces of authentication information displayed by said display unit as authentication information used for authentication processing with the server apparatus.

8. A relay apparatus comprising
   a control unit comprising:
   a first determination unit configured to determine whether said relay apparatus holds authentication information for using image sharing services or a communication apparatus, which communicates with a server apparatus providing the image sharing services via said relay apparatus, holds the authentication information;

a second determination unit configured to determine, based on a determination result of said first determination unit, whether said relay apparatus transmits image data using the image sharing services to the server apparatus or said relay apparatus causes the communication apparatus to transmit the image data to the server apparatus;

a transmission unit configured to transmit the image data to the server apparatus in a case where said second determination unit determines that said relay apparatus transmits the image data to the server apparatus; and a request unit configured to request the communication apparatus to transmit the image data to the server apparatus in a case where said second determination unit determines that said relay apparatus causes the communication apparatus to transmit the image data to the server apparatus.

9. The apparatus according to claim 8, the control unit further comprising an authentication unit configured to perform authentication processing using the authentication information with the server apparatus in a case where said second determination unit determines that said relay apparatus transmits the image data to the server apparatus, wherein said transmission unit transmits the image data to the server apparatus after authentication processing by said authentication unit.

10. The apparatus according to claim 9, wherein the relay apparatus performs the authentication processing by performing an encrypted communication with the server apparatus.

11. The apparatus according to claim 8, the control unit further comprising a decision unit configured to decide one of a bridge function which bridges a data frame of not lower than a TCP layer, NAT (Network Address Translation) function, or SOCKS proxy function as an operation to be executed by said relay apparatus.

12. The apparatus according to claim 8, the control unit further comprising a comparison unit configured to compare an update date of the authentication information held by said communication apparatus with an update date of the authentication information held by the relay apparatus in a case where said determination unit determines that both the communication apparatus and said relay apparatus hold the authentication information, wherein said second determination unit:

1) determines, in a case where said relay apparatus holds the authentication information having newer update date based on a comparison result of said comparison unit, that said relay apparatus transmits the image data to the server apparatus; and 2) determines, in a case where the communication apparatus holds the authentication information having newer update date based on a comparison result of said comparison unit, that said relay apparatus causes the communication apparatus to transmit the image data to the server apparatus.

13. The apparatus according to claim 8, wherein in a case where said first determination unit determines that both said relay apparatus and the communication apparatus hold the authentication information, said second determination unit determines, based on a priority order which is set in advance, whether said relay apparatus transmits the image data to the server apparatus or said relay apparatus causes the communication apparatus to transmit the image data to the server apparatus.

14. The apparatus according to claim 8, the control unit further comprising:

a display unit configured to display pieces of the authentication information held by at least one of the communication apparatus and said relay apparatus; and a selection unit configured to select one of the pieces of authentication information displayed by said display unit as authentication information used for authentication processing with the server apparatus.

15. A control method of a communication apparatus, the method comprising:

a first determination step of determining whether the communication apparatus holds authentication information for using image sharing services or a relay apparatus, which relays communication between the communication apparatus and a server apparatus providing the image sharing services, holds the authentication information;

a second determination step of determining, based on a determination result in the first determination step, whether the communication apparatus transmits image data using the image sharing services to the server apparatus or the communication apparatus causes the relay apparatus to transmit the image data to the server apparatus;

a transmission step of:

1) transmitting the image data to the server apparatus as a transmission destination in a case where the second determination step determines that the communication apparatus transmits the image data to the server apparatus; and 2) transmitting the image data to the relay apparatus as a transmission destination in a case where the second determination step determines that the communication apparatus causes the relay apparatus to transmit the image data to the server apparatus;

a request step of requesting the relay apparatus to transmit the image data to the server apparatus in a case where the second determination step determines that the communication apparatus causes the relay apparatus to transmit the image data to the server apparatus, wherein the request step does not request a transmission of the image data in a case where the second determination step determines that the communication apparatus transmits the image data to the server apparatus.

16. A control method of a relay apparatus, the method comprising:

a first determination step of determining whether the relay apparatus holds authentication information for using image sharing services or a communication apparatus, which communicates with a server apparatus providing the image sharing services via the relay apparatus, holds the authentication information;

a second determination step of determining, based on a determination result of the first determination step, whether the relay apparatus transmits image data using the image sharing services to the server apparatus or the relay apparatus causes the communication apparatus to transmit the image data to the server apparatus;

a transmission step of transmitting the image data to the server apparatus in a case where the second determination step determines that the relay apparatus transmits the image data to the server apparatus; and a request step of requesting the communication apparatus to transmit the image data to the server apparatus in a case where the second determination step determines that the relay apparatus causes the communication apparatus to transmit the image data to the server apparatus.

17. A non-transitory computer-readable storage medium storing a program for controlling a computer to execute a control method of a communication apparatus, the method comprising:
   a first determination step of determining whether the communication apparatus holds authentication information for using image sharing services or a relay apparatus, which relays communication between the communication apparatus and a server apparatus providing the image sharing services, holds the authentication information;
   a second determination step of determining, based on a determination result in the first determination step, whether the communication apparatus transmits image data using the image sharing services to the server apparatus or the communication apparatus causes the relay apparatus to transmit the image data to the server apparatus;
   a transmission step of:
   1) transmitting the image data to the server apparatus as a transmission destination in a case where the second determination step determines that the communication apparatus transmits the image data to the server apparatus; and
   2) transmitting the image data to the relay apparatus as a transmission destination in a case where the second determination step determines that the communication apparatus causes the relay apparatus to transmit the image data to the server apparatus;
   a request step of requesting the relay apparatus to transmit the image data to the server apparatus in a case where the second determination step determines that the communication apparatus causes the relay apparatus to transmit the image data to the server apparatus,
   wherein the request step does not request a transmission of the image data in a case where the second determination step determines that the communication apparatus transmits the image data to the server apparatus.

18. A non-transitory computer-readable storage medium storing a program for controlling a computer to execute a control method of a relay apparatus, the method comprising:
   a first determination step of determining whether the relay apparatus holds authentication information for using image sharing services or a communication apparatus, which communicates with a server apparatus providing the image sharing services via the relay apparatus, holds the authentication information;
   a second determination step of determining, based on a determination result of the first determination step, whether the relay apparatus transmits image data using the image sharing services to the server apparatus or the relay apparatus causes the communication apparatus to transmit the image data to the server apparatus;
   a transmission step of transmitting the image data to the server apparatus in a case where the second determination step determines that the relay apparatus transmits the image data to the server apparatus; and
   a request step of requesting the communication apparatus to transmit the image data to the server apparatus in a case where the second determination step determines that the relay apparatus causes the communication apparatus to transmit the image data to the server apparatus.

* * * * *